United States Patent
Cleminson et al.

(10) Patent No.: US 11,098,253 B1
(45) Date of Patent: Aug. 24, 2021

(54) ROTARY SCREENING OF A CONDITIONED OIL SAND SLURRY, AND AN IMPROVED ROTARY SCREENING APPARATUS

(71) Applicant: SYNCRUDE CANADA LTD. in trust for the owners of the Syncrude Project as such owners exist now and in the future, Fort McMurray (CA)

(72) Inventors: Ron Cleminson, Fort McMurray (CA); Dan Wolfe, Edmonton (CA); Michael Carniato, Sherwood Park (CA); Stefano Chiovelli, Edmonton (CA)

(73) Assignee: SYNCRUDE CANADA LTD., Calgary (CA), IN TRUST FOR THE OWNERS OF THE SYNCRUDE PROJECT AS SUCH OWNERS EXIST NOW AND IN THE FUTURE ( * ) Notice: Subject to any disclaimer, the term of this patent is extended or adjusted under 35 U.S.C. 154(b) by 0 days.

(21) Appl. No.: 16/850,888

(22) Filed: Apr. 16, 2020

(51) Int. Cl.
*C10G 1/04* (2006.01)
*B01D 33/11* (2006.01)

(52) U.S. Cl.
CPC .............. *C10G 1/045* (2013.01); *B01D 33/11* (2013.01)

(58) Field of Classification Search
CPC ................................ B02C 23/08; E21F 13/002
USPC ........................................................ 208/391
See application file for complete search history.

(56) References Cited

U.S. PATENT DOCUMENTS

| | | | | |
|---|---|---|---|---|
| 4,635,860 A * | 1/1987 | Kruyer | .................... | B02C 17/02 |
| | | | | 208/390 |
| 4,974,993 A * | 12/1990 | Crabbi | .................. | E01C 23/065 |
| | | | | 404/79 |
| 5,264,118 A | 11/1993 | Cymerman et al. | | |
| 5,772,127 A | 6/1998 | Maciejewski et al. | | |
| 8,535,485 B2 | 9/2013 | Cleminson et al. | | |
| 9,694,390 B1 * | 7/2017 | Tsutsumi | .................. | B07B 1/24 |
| 2005/0134102 A1 | 6/2005 | Cymerman et al. | | |
| 2006/0273048 A1 * | 12/2006 | Doyle | ........................ | C05F 3/06 |
| | | | | 210/781 |
| 2008/0121493 A1 * | 5/2008 | Bjornson | ................ | E21C 41/31 |
| | | | | 198/301 |
| 2013/0256196 A1 * | 10/2013 | Spence | .................. | C10G 1/047 |
| | | | | 208/391 |

(Continued)

FOREIGN PATENT DOCUMENTS

CA   2029795 A1   5/1991
CA   2719865 A1   5/2011

*Primary Examiner* — Nina Bhat
(74) *Attorney, Agent, or Firm* — Bennett Jones LLP

(57) ABSTRACT

A method for extracting bitumen from an oil sand slurry involves limiting the size of rock and clay lumps in the slurry to a first size, conditioning the slurry in a pipeline, screening the slurry through a rotary screening apparatus to remove the lumps that are larger than a second size, and subjecting the slurry to gravity separation to separate the bitumen as a bitumen froth. A fastener assembly for securing a screen panel to a drum shell of a rotary screening apparatus includes an outer insert for insertion into an aperture of a drum shell, an inner insert for insertion through an aperture of the screen panel and into an inward facing pocket of the outer insert, and a bolt for securing together the outer and inner inserts. An insert for removable insertion into an aperture of a drum of a rotary screening apparatus defines a screening aperture.

13 Claims, 18 Drawing Sheets

(56) References Cited

U.S. PATENT DOCUMENTS

| | | | |
|---|---|---|---|
| 2013/0284641 A1* | 10/2013 | Siy | C10G 1/047 |
| | | | 208/391 |
| 2017/0008003 A1 | 1/2017 | Cleminson et al. | |
| 2018/0347333 A1* | 12/2018 | Cleminson | E21C 41/31 |
| 2019/0224718 A1* | 7/2019 | Carniato | B07B 13/16 |
| 2019/0256782 A1* | 8/2019 | Shelton, Jr. | C10C 3/007 |
| 2019/0256783 A1* | 8/2019 | Shelton, Jr. | B01D 21/283 |

\* cited by examiner

ROTARY SCREENING OF A CONDITIONED OIL SAND SLURRY, AND AN IMPROVED ROTARY SCREENING APPARATUS

FIELD OF THE INVENTION

The present invention relates to a process for extracting bitumen from oil sand ore, and to improvements to a rotary screening apparatus.

BACKGROUND OF THE INVENTION

Oil sand ore deposits in northern Alberta, Canada have a typical weight composition of about 85% solids, 10% bitumen, and 5% water. The solids include sand, clay, and rocks. About 70% to 85% weight of the solids are coarse solids (i.e., greater than about 44 μm in size). After primary sizing to a nominal top size (i.e., maximum size) of about 400 mm, an average of 5% of the solids require further sizing to reach a nominal top size of 125 mm, which is the largest top size reliably pumped in any commercial oil sand operation. After 2 to 3 km of hydrotransport in a pipeline, about 2 to 5% weight of the solids are above 10 mm in size, and of those, 1 to 3% weight of the solids are above 50 mm in size.

U.S. Pat. No. 5,264,118 (Cymerman et al.; 1993-11-23) and Canadian patent no. 2,029,795 (Cymerman et al.; 1996-11-05) describe mixing mined oil sand ore with hot water and air to produce an aerated slurry at the mine site. The slurry is pumped in a pipeline from the mine site for a sufficient distance so that the slurry is "conditioned"—i.e., the lumps of oil sand ore ablate, and the flecks of bitumen separates from the sand, coalesce into droplets, and become aerated. The process of conditioning the slurry by transport through a pipeline is known as "hydrotransport". The conditioned slurry continues in the pipeline into a primary separation vessel (PSV) where the bitumen is recovered as bitumen froth.

The slurry may be "front-end sized" to remove oversize material from the slurry at the slurry preparation site before hydrotransport. Front-end sizing may be performed by screening the slurry (see Cymerman et al. (1993), supra, and U.S. Pat. No. 5,772,127 (Maciejewski et al.; 1998-06-30)), or use of a rotary digester (see U.S. patent publication 2005/0134102 A1 (Cymerman et al.; 2005-06-23)). Front-end sizing removes all oversize material, including both hard clay and rock lumps, as well as oil sand ore lumps. Downstream equipment must be designed with appropriate clearances to avoid blockage. Any oversize oil sand material rejected from a front-end sizing process will constitute a potential bitumen loss. Rejected oil sand material can be reprocessed in a secondary process or sent to waste.

In practice, front-end sizing may be limited to removing only oversize material having sizes larger than about 100 to 125 mm, although some processes exist where front-end screen openings are as small as 50 mm. Despite the ability to remove particles between 50 mm to about 125 mm, there are two reasons why particles within this size range might not be removed in front-end sizing. First, decreasing the oversize material size requires a decrease in the size of screen openings used for front-end sizing. This in turn decreases the throughput rate of slurry through the screen, and the bitumen extraction process as a whole. Second, rejection of oversize material in the slurry prior to hydrotransport results in a loss of bitumen associated with the oversize material from the process stream. Removing a larger fraction of oversize material increases the amount of lost bitumen.

Accordingly, even after front-end sizing, the slurry may still contain relatively large lumps that can damage process equipment from the slurry preparation site to and including the PSV, and coarse tailings systems. As noted, about 1 to 3% by weight of the solids in oil sand ore are above 50 mm in size after 2 to 3 km of hydrotransport. Under certain operating conditions, this may translate to a flow rate of 40 to 60 large rocks per second through the process equipment, which can cause significant wear to process equipment.

SUMMARY OF THE INVENTION

There remains a need in the art for handling of the large clay and rock lumps in oil sand ore slurry downstream of the slurry preparation site in a process that occurs prior to bitumen extraction. Further, there remains a need in the art for an improved apparatus for removing large clay and rock lumps from an oil sand ore slurry, which is durable and convenient to maintain.

In one aspect, the present invention comprises a method for extracting bitumen from a slurry comprising bitumen, water, and lumps comprising one or a combination of clay and rock. The method comprises the sequential steps of:

(a) limiting the size of the lumps in the slurry to a first size by comminuting the lumps larger than the first size before or during preparation of the slurry, or by screening the slurry to remove the lumps larger than the first size from the slurry;

(b) transporting the slurry through a pipeline for a distance sufficient to at least partially condition the slurry;

(c) screening the slurry through a rotary screening apparatus to remove the lumps that are larger than a second size from the slurry, wherein the second size is smaller than the first size; and (d) subjecting the slurry to gravity separation to separate the bitumen as a bitumen froth.

In one embodiment of the method, the first size is about 125 mm. In embodiments of the method, the second size is about 68 mm or less, more particularly about 50 mm or less, or more particularly, about 25 mm or less.

In one embodiment of the method, the slurry is only partially conditioned in step (b), and the method further comprises transporting the slurry through a second pipeline to further condition the slurry after step (c) and before step (d).

In one embodiment of the method, the rotary screening apparatus comprises a drum defining screening apertures, and internally lined by a weir defining a helical path. The helical path may define a slope angle of about 30 degrees relative to a radial plane of the drum.

In one embodiment of the method, the rotary screening apparatus comprises a drum defining screening apertures with a reverse taper angle. The reverse taper angle may be less than or equal to about 10 degrees.

In another aspect, the present invention comprises a fastener assembly for securing a screen panel internally to a drum shell of a drum of a rotary screening apparatus, wherein the drum defines an inward direction and an outward direction extending radially towards and away from, respectively, from a central axis of the drum. The fastener assembly comprises an outer insert, an inner insert, and a bolt. The outer insert comprises: an inner portion for insertion into an aperture of the drum shell; an inward facing bearing surface for engagement with an outward facing surface of the drum shell; an inward facing pocket; and a radially extending threaded bore. The inner insert comprises: an outer portion for insertion through an aperture of the screen panel and into the inward facing pocket of the outer insert; an outward facing bearing surface for engagement with an inward facing surface of the screen panel; and a radially extending bolt opening aligned with the threaded bore of the outer insert. The bolt comprises: a bolt head for direct or indirect engagement with an inward facing surface of the inner insert; and a threaded shaft for insertion through the bolt opening of the inner insert, and into mating relationship with the threaded bore of the outer insert.

In one embodiment of the fastener assembly, the fastener assembly further comprises a retaining ring received with a groove defined by the inner portion of the outer insert, and for engagement with the drum shell to retain the inner portion of the outer insert within the aperture defined by the drum shell.

In one embodiment of the fastener assembly, the outer insert is in the form of a flanged bushing.

In one embodiment of the fastener assembly, the inner insert is in the form of a flanged bushing.

In one embodiment of the fastener assembly, the outer portion of the inner insert comprises a non-cylindrical external surface. The non-cylindrical external surface may be for engagement with a complementarily shaped non-cylindrical surface defining the aperture of the screen panel, for limiting or preventing rotation of in the inner insert relative to the screen panel when the outer portion of the inner insert is received in the aperture of the screen panel.

In one embodiment of the fastener assembly, the outer portion of the inner insert comprises a non-cylindrical external surface, and the outer insert comprises a non-cylindrical surface defining the pocket of the outer insert. The non-cylindrical external surface of the inner insert and the non-cylindrical external surface of the outer insert are complementarily shaped for limiting or preventing rotation of in the inner insert relative to the outer insert when the outer portion of the inner insert is received in the pocket of the outer insert.

In one embodiment of the fastener assembly, the inner insert defines a pocket that receives the bolt head.

In one embodiment of the fastener assembly, an inward facing external surface of the inner insert has a frusto-conical shape.

In one embodiment of the fastener assembly, a radial thickness of the inner insert is dimensioned such that an inward facing external surface of the inner insert is at least partly recessed within the thickness of the screen panel when the outward facing bearing surface of the inner insert engages a counterbore surface of the screen panel surrounding the aperture of the screen panel.

In one embodiment of the fastener assembly, an inward facing external surface of the inner insert comprises a material having a hardness greater than a hardness of a material comprising a remainder of the inner insert.

In another aspect, the present invention comprises an insert for removable insertion into an aperture of a drum of a rotary screening apparatus, wherein the drum defines an inward direction and an outward direction extending radially towards and away from, respectively, from a central axis of the drum. The insert defines at least one screening aperture for the drum.

In one embodiment of the insert, the insert comprises: a body for insertion into the aperture of the drum, wherein the body defines the at least one screening aperture; and a flange for engagement with the drum to prevent passage of the body through the aperture of the drum.

In one embodiment of the insert, an inward facing surface of the insert projects inwardly from an inner surface of the drum, when the insert is received in the aperture of the drum.

In one embodiment of the insert, an inward facing surface of the insert is crowned or domed in shape.

In one embodiment of the insert, the at least one screening aperture comprises a plurality of screening apertures. At least two of the screening apertures may differ in size.

In one embodiment of the insert, the at least one screening aperture has a reverse taper angle. The reverse taper angle may be less than or equal to about 10 degrees.

In another aspect, the present invention comprises a drum assembly for a rotary screening apparatus, wherein the drum assembly defines an inward direction and an outward direction extending radially towards and away from, respectively, from a central axis of the drum. The drum assembly comprises: a drum shell; a screen panel internally lining the drum shell; and an insert removably disposed within an aperture of the screen panel, and defining at least one screening aperture in communication with an aperture defined by the drum shell.

In one embodiment of the drum assembly, the insert comprises: a body disposed within the aperture of the screen panel, and defining the at least one screening aperture; and a flange attached to and extending away from the body, wherein the flange is clamped, directly or indirectly, by the screen panel and the drum shell to retain the insert to the drum.

In one embodiment of the drum assembly, the drum assembly further comprises a bushing disposed within the aperture defined by the drum shell, wherein the bushing comprises a flange that is clamped, directly or indirectly, by the flange of the insert and the drum shell to retain the bushing to the drum.

In one embodiment of the drum assembly, the insert comprises a material having a hardness greater than a hardness of a material comprising the screen panel.

In one embodiment of the drum assembly, an inward facing surface of the insert projects inwardly from an inner surface of the drum.

In one embodiment of the drum assembly, an inward facing surface of the insert is crowned or domed in shape.

In one embodiment of the drum assembly, the at least one screening aperture comprises a plurality of screening apertures. At least two of the screening apertures may differ in size.

In one embodiment of the drum assembly, the at least one screening aperture has a reverse taper angle. The reverse taper angle may be less than or equal to about 10 degrees.

BRIEF DESCRIPTION OF THE DRAWINGS

In the drawings, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. Any dimensions shown are in millimeters unless otherwise indicated.

DETAILED DESCRIPTION OF EMBODIMENTS OF THE INVENTION

Definitions

The invention relates to a process for extracting bitumen from oil sand ore, and to improvements to a rotary screening apparatus. Any term or expression not expressly defined herein shall have its commonly accepted definition understood by a person skilled in the art.

Process for Extracting Bitumen from Oil Sand Ore, Including Screening of Conditioned Oil Sand Slurry.

Figure 1:
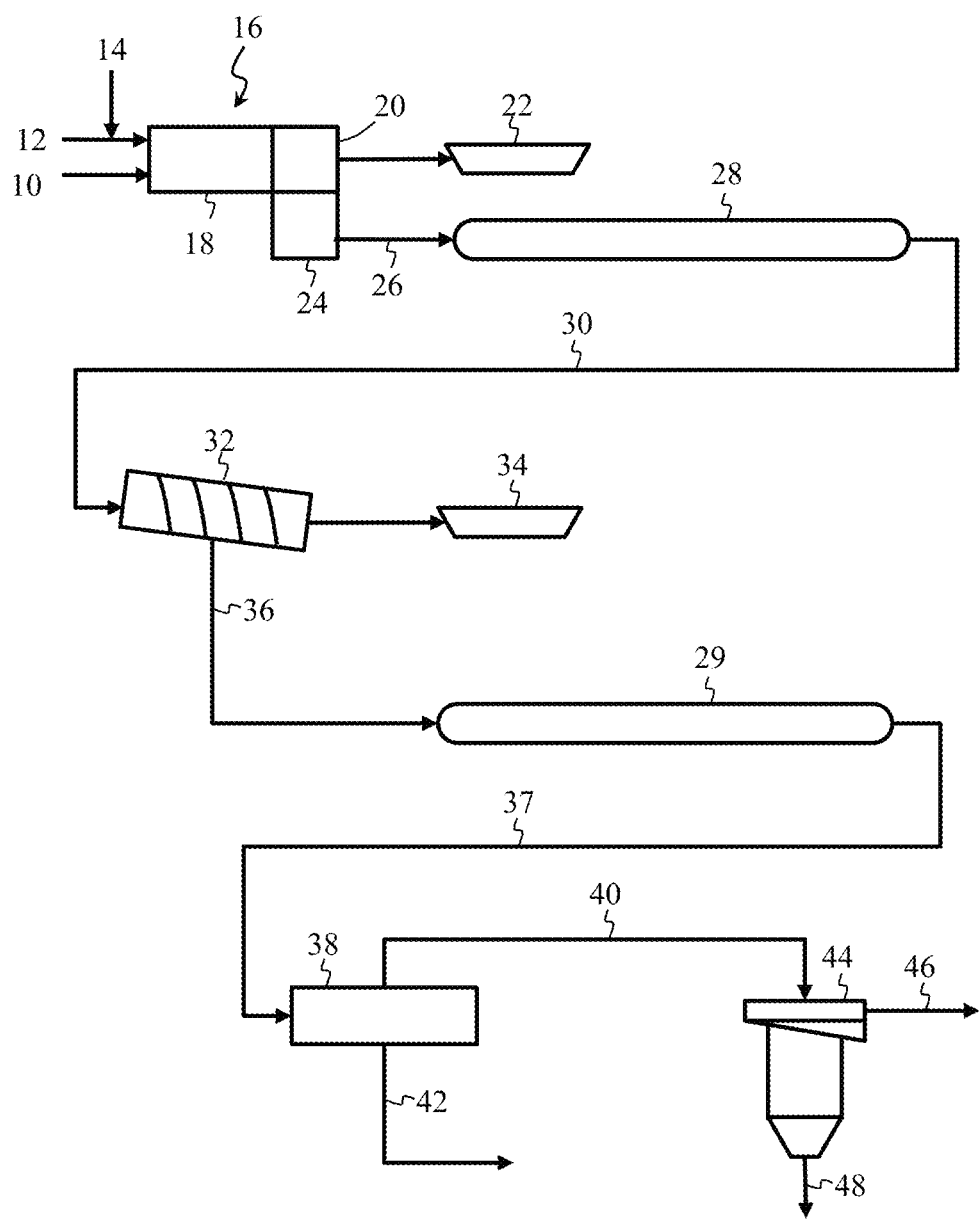
FIG. 1 shows a schematic representation of an embodiment of a process line of the present invention for extracting bitumen from oil sand ore.

FIG. 1 shows a schematic representation of an embodiment of a process line of the present invention for extracting bitumen from oil sand ore.

Mined oil sand ore (10), heated water (12), and optionally a conditioning aid (14) (e.g., sodium hydroxide) are mixed together at a slurry preparation unit (16), which may be located near a mine site. The slurry preparation unit (16) may be any device known in the art that is suitable for producing an oil sand slurry suitable for hydrotransport in a pipeline. In the embodiment shown, the slurry preparation unit (16) includes a tumbler or mix box (18) for mixing together the oil sand ore (10), heated water (12), and conditioning aid (14). In the embodiment shown, the slurry preparation unit (16) also includes a screening device (20) for front-end sizing of the oil sand slurry to separate, from the slurry, oversize material (e.g., clay and rock lumps), which is deposited in a first reject pile (22). The oversize material in the first reject pile may be crushed to reduce its particle size, and the crushed material may be reprocessed in the tumbler or mix box (18) of the slurry preparation unit (16). In another embodiment, the slurry preparation unit (16) may comprises a "primary crusher" to crush the oil sand ore to a suitable size for conveyance on a conveyor to the tumbler or mix box (18). In still another embodiment, the slurry preparation unit (16) may comprise an apparatus for "wet crushing" oil sand ore as described in U.S. Pat. No. 8,535,485 (Cleminson et al.; 2013-09-17), or U.S. patent application publication US 2017/0008003 A1 (Cleminson et al.; 2017-01-12). In brief, such an apparatus includes a slurry preparation tower containing a sequence of sizer devices to comminute the oil sand ore by crushing pieces of oil sand in the process of preparing a pumpable oil sand slurry.

Accordingly, the term "front-end sizing" as used herein refers generally to limiting the size of the lumps in the slurry, before transport of the slurry in the hydrotransport pipeline (28). Such front-end sizing may involve one or a combination of comminuting the lumps prior to slurry preparation (e.g., using a "primary crusher"), comminuting the lumps during slurry preparation (e.g., using a "wet crushing" apparatus), or subjecting the prepared slurry to screening using a screening device (20) prior to transport in a hydrotransport pipeline (28).

As a non-limiting example, the front-end sizing may be performed to remove lumps that are larger than about 125 mm in size. In the embodiment shown, the slurry preparation unit (16) includes a pump box (24) that feeds the pumps that move the produced oil sand slurry (26) through a hydrotransport pipeline (28). The hydrotransport pipeline (28) is long enough to allow the oil sand lumps in the slurry (26) to be ablated to a top size (i.e., maximum size) that is reliably smaller than the screen apertures in the rotary screening apparatus (32) (as discussed below). Although it is possible, the slurry need not be fully "conditioned" at this stage of the process. In this context, "condition", "conditioned", "conditioning" and like terms means that the larger lumps of the oil sand ore are ablated, and the flecks of bitumen separate, coalesce into droplets, and become aerated.) As a non-limiting example, U.S. Pat. No. 5,264,118 (Cymerman et al.; 1993-11-23) (the entire contents of which are incorporated herein by reference, where permitted) teaches that about 2.5 km of pipeline allows for complete conditioning of the oil sand slurry.

The partially conditioned oil sand slurry (30) passes through a rotary screening apparatus (32). The rotary screening apparatus (32) separates, from the conditioned oil sand slurry (30), oversize material (e.g., clay and rock lumps), which is deposited in a second reject pile (34). The rock component of the rejected oversize material may be useful as road building, ditch lining, or reclamation material. A screened oil sand slurry (36) emerges from the rotary screening apparatus (32).

In one embodiment, the rotary screening apparatus (32) may be located about 2 km to about 3 km downstream of the site of slurry preparation, to allow for sufficient ablation of oil sand lumps in the oil sand slurry before reaching the rotary screening apparatus (32). Suppose that the front-end sizing at the slurry preparation site was performed such that the produced oil sand slurry (26) contains lumps of clay, rock, and oil sand ore having sizes up to about 125 mm. After about 2 km to about 3 km of hydrotransport, it is expected that the oil sand ore lumps would be ablated to a size smaller than about 12.5 mm, while a substantial portion of the clay and rock lumps would remain larger than 50 mm. As such, screening the conditioned oil sand slurry (30) after about 2 km to 3 km of hydrotransport may correspond to an earliest opportunity to remove the clay and rock lumps larger than 50 mm, after substantial or complete ablation of oil sand ore lumps. In other embodiments, the present invention may be practiced to effect different size ranges of these components of the slurry, it being understood that the foregoing size ranges are exemplary and non-limiting.

As noted, the screening device (20) is used to remove oversize material from the oil sand slurry before conditioning in the hydrotransport pipeline (28), while the rotary screening apparatus (32) is used to remove oversize material from the partially conditioned oil sand slurry (30) after conditioning in the hydrotransport pipeline (28). The screening device (20) may be configured to remove may remove a first fraction of oversize material that is larger than a first size, $D_1$. The rotary screening apparatus (32) may be configured to remove a second fraction of oversize material that is larger than a second size, $D_2$, which is smaller than $D_1$.

The first size, $D_1$, and the second size, $D_2$, may be selected having regard to optimizing bitumen recovery in the process line. Other considerations for selecting the first size, $D_1$, and the second size, $D_2$, may include maximum clearances of pumps and other equipment, effects of wear on parts of the process line, optimizing de-sanding performance, and managing the volume of material at the first and second reject piles (22, 34). It is believed that a second size, $D_2$, of about 25 mm or less may allow for an optimal balance of extraction and desanding performance, control of oversize waste hauling expense, mitigation of bitumen loss, and control of wear on downstream process equipment (e.g., pipes, pumps, and vessels).

A potential benefit of screening the conditioned oil sand slurry (30) in the rotary screening apparatus (32) after hydrotransport is an increase in bitumen recovery. To explain, without the rotary screening apparatus (32), the screening device (20) would have to be configured such that $D_1$ is equal to or less than the clearances of pumps or other equipment downstream of the hydrotransport pipeline (28), Dmax. Accordingly, any bitumen associated with oversize material having a size greater than $D_1$ would be lost to the first reject pile (22). In contrast, with the rotary screening apparatus (32), the screening apparatus (20) may be configured so that $D_1$ is greater than Dmax, while the rotary screening apparatus (32) may be configured so that $D_2$ is equal to or less than Dmax. Accordingly, the fraction of material having a size between $D_1$ and $D_2$ is included in the oil sand slurry (26) that is conditioned in the hydrotransport pipeline (28). Bitumen associated with this material may separate into the partially conditioned oil sand slurry (30), and be recovered from the screened conditioned oil sand slurry (36) in downstream components in the process line. In particular, an increase in bitumen in the slurry may also benefit the efficacy and cost of the separation process in the PSV (44).

Another potential benefit of screening the partially conditioned oil sand slurry (30) in the rotary screening apparatus (32) after hydrotransport is a decrease in wear rate of process equipment (e.g., pipes, pumps, and vessels), downstream of the rotary screening apparatus (32). As a non-limiting example, the first size, $D_1$, may be about 125 mm. As non-limiting examples, the second size, $D_2$, may be about 68 mm, 50 mm, 35 mm, 28 mm, 25 mm, 18 mm, or 15 mm. In one embodiment, the second size, $D_2$, may be in the range of about 15 mm to about 50 mm, and more preferably between about 15 mm to 30 mm. Empirical data on screening of slurries containing clay and rock lumps suggests that reduction of the second size, $D_2$, from about 125 mm to about 68 mm may allow for about a 50% to 60% reduction of wear rate of process piping. This data also suggests that reduction of the second size, $D_2$, from about 125 mm to about 50 mm may allow for about a 50 to 70% reduction of wear rate of process piping.

Another potential benefit of screening the partially conditioned oil sand slurry (30) in the rotary screening apparatus (32) is a decrease in the required pump pressure for transporting the slurry downstream of the rotary screening apparatus (32) to the PSV (44). This can help to reduce energy costs, extend the wear life, availability and reliability of pumps, and reduce the number of required pump stages.

Returning to FIG. 1, the screened, partially conditioned oil sand slurry (36) is further transported in a second hydrotransport pipeline (29), to further condition the oil sand slurry. After hydrotransport in the second pipeline (29), the slurry is referred to herein as a "fully conditioned oil sand slurry" (37), to indicate that the slurry is more conditioned than the partially conditioned oil sand slurry (36), but it will be understood that the term does not require any particular degree of conditioning.

The fully conditioned oil sand slurry (37) is further reduced in solids content at a de-sander circuit (38). In one embodiment, the de-sander circuit (38) may include a solid/liquid separator/splitter for gravity separation of solids, in accordance with the teachings of Canadian patent 2,719,865 (Siy et al.; 2013-08-27). The de-sander circuit (38) separates a bitumen-rich overflow (40) from de-sander circuit tails (42), which may be processed for secondary bitumen recovery or used to form composite tailings for land reclamation.

The bitumen-rich overflow (40) continues to a primary separation vessel (PSV) (44). The PSV (44) separates a bitumen froth overflow (46), from PSV tails (48), which may be processed for secondary bitumen recovery or used to form composite tailings for land reclamation. The bitumen froth overflow (46) is subjected to additional treatment, such as naphthenic or paraffinic froth treatment, to remove solids and water, and produce a diluted bitumen product.

Rotary Screening Apparatus

Figure 2:
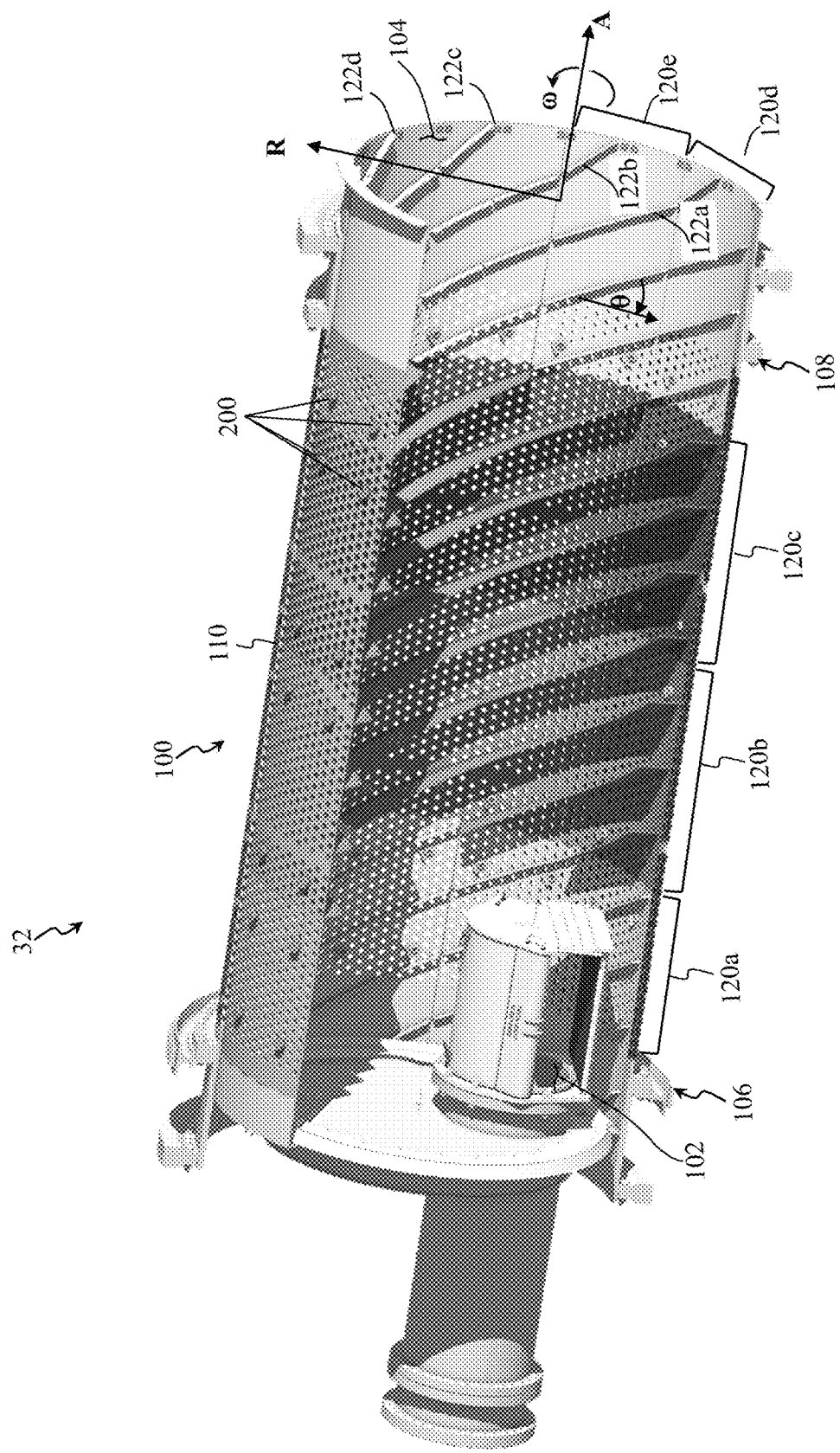
FIG. 2 shows a perspective view of an embodiment of part of a rotary screening apparatus of the present invention, with a portion of the drum shell removed to show some of the screen panels of the drum.

FIG. 2 shows a first embodiment of a rotary screening apparatus (32) of the present invention, which may be used in the process line of FIG. 1, or for other applications. The rotary screening apparatus (32) includes a cylindrical drum (100) having a sidewall that defines a plurality of screening apertures, which allow to material pass through, while the drum (100) retains oversize material. The drum (100) extends from an elevated inlet (102) to a lower outlet (104), and is rotatable about a central axis (A) that may be inclined above horizontal. For convenient reference, the "axial direction" refers to that direction parallel to the central axis (A) of the drum (100), while the "radial direction" refers to a direction that is orthogonal to the axial direction, such as the direction of radial axis (R). The ends of the drum (100) are attached to a pair of support members (106, 108), which are engaged by a mechanism for rotating the drum (100) about the central axis (A). For the sake of clarity, FIG. 2 does not show certain features conventionally associated with a rotary screening apparatus as follows. A frame may be provided for supporting the drum (100) for rotation about the central axis (A). A motor and drivetrain may be provided for driving rotation of the drum (100) about the central axis (A). A hopper may be provided for directing a feed material into the inlet (102). A trough or chute may be provided for directing separated oversize material away from the outlet (104). A sluice box may be provided beneath the drum (100) for receiving the screened material from the drum (100) via its screening apertures.

In an exemplary use and operation in the process line of FIG. 1, the partially conditioned oil sand slurry (30) feeds into the elevated inlet (102), and proceeds towards the lower outlet (104). As the partially conditioned oil sand slurry (30) moves towards the outlet (104), rotation of the drum (100) about the central axis (A) results in fluid material and undersized material passing radially out of the drum (104) through its screening apertures, to form the screened partially conditioned oil sand slurry (36), which may collected in a sluice box beneath the drum (100). Oversized material advances axially through the drum (100) until it exits through the outlet (104), whereupon it may be conveyed to the second reject pile (34).

In FIG. 2, the drum (100) is formed by a perforated drum shell (110) lined internally by a plurality of screen panels (120). In FIG. 2, a portion of the drum shell (110) is cut-away to show the plurality of arcuate screen panels (120a to 120e). The screen panels (120) define the screening apertures of the drum (100), which are aligned with apertures defined by the drum shell (110). The screen panels (120) protect the drum shell (110) from wear and damage, due to abrasion by and impacts with screened material. The screen panels (120) are removably attached to the drum shell (110), and can be individually removed for repair or replacement to address localized damage to a particular screen panel (120). In another embodiment (not shown), the liner panels (120) may be supported in a space-frame structure rather than a perforated drum shell (110). The use of a space-frame structure offers more flexibility in drainage hole size and spacing as it is does not require alignment of the apertures of the screen panels (120) with the apertures of the perforated drum shell (110).

Figure 3:
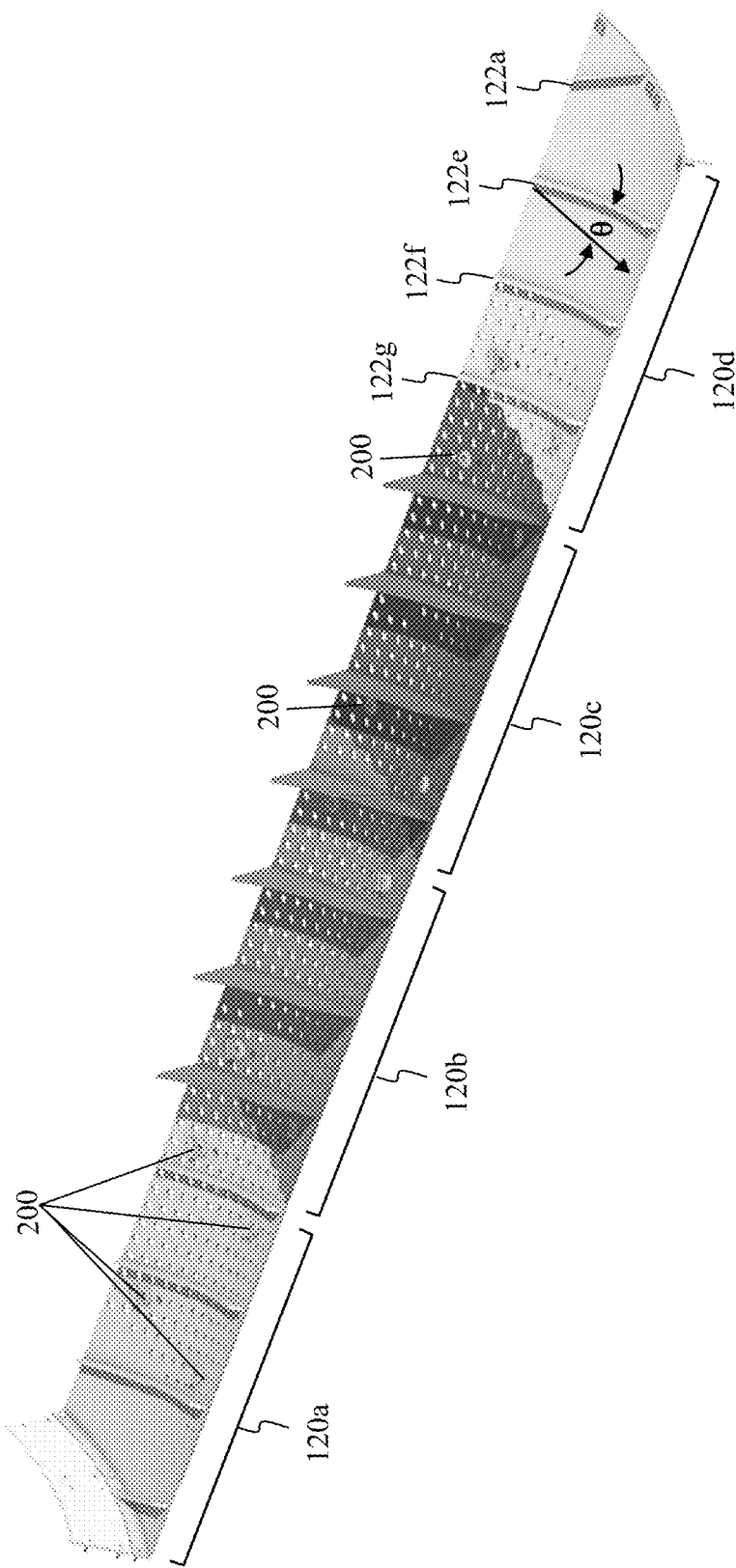
FIG. 3 shows a perspective view of some of the screen panels of the apparatus of FIG. 2.

In the embodiment shown in FIGS. 2 and 3, the circumferentially aligned edges of the screen panels (120a to 120d) have a saw-tooth shape, and abut against each other so that screen panels (120a to 120d) collectively define the axial length of the drum shell (110). The axially aligned edges of the screen panels (120a and 120e) are straight, and abut against each other so that the screen panels (120) collectively define part of the circumference of the drum shell (110). In other embodiments, the number and shape of screen panels (120) may differ from that shown in FIG. 2.

Embodiments of the rotary screening apparatus (32) of the present invention address certain deficiencies of a conventional rotary screening apparatus (32) with one or a combination of improvements, as described below.

Drum with Internal Helical Weirs.

As conditioned oil sand slurry (36) is screened through the drum (100), the oversize material takes time to tumble from the inlet (102) to the outlet (104) Excessive residence time of oversize material within the drum (100) can have two undesirable effects. First, it can increase wear and damage to the drum (100). Second, it can increase ablation of clay lumps, thereby increasing the clay fines content of the screened conditioned oil sand slurry (30) and the production rate of fluid fine tailings (FFT).

In the embodiment shown in FIGS. 2 and 3, the inner surface of the drum (100) has a plurality of weirs (122) (exemplary weirs are shown as (122a to 122f)), to reduce the residence time of oversize material in the drum (100). As used herein, the term "inner surface of the drum" refers to radially inward facing surface of the drum (100) that contacts the feed material. In the embodiment shown in FIG. 2, the drum shell (110) is lined by screen panels (120), and therefore the "inner surface" of the drum (100) is defined by the radially inward-facing surface of the screen panels (120). In other embodiments (not shown), the drum (100) may not have drum liner panels (120), in which case the "inner surface" of the drum (100) is formed by the radially inward-facing surface of a structure analogous to an unlined drum shell (110).

In the embodiment of FIGS. 2 and 3, exemplary weirs (122a to 122f) project radially inward from the inner surface of the screen panels (120). The weirs (122) extend in a helical path along the inner surface of the drum (100). The chirality of each helical path is opposite to the rotational direction of the drum (100). In the embodiment of FIG. 2 for example, from a line-of-sight in the direction of central axis (A), the helical path extends in a counter-clockwise path away from the observer, whereas the drum (100) rotates in a clockwise direction as shown by the curved arrow line (w).

In the embodiment of FIGS. 2 and 3, each weir (122) is made of a plurality of discrete, elongate linear plates, attached to the inner surface of the screen panels (120). For each weir (122), the gap between the ends of its constituent plates is relatively small in relation to the dimensions of the drum (100), so that the plates collectively define a substantially smooth helical path despite a minor discontinuity between them. In alternative embodiments (not shown), each of the weirs (122) may be formed by a single continuous member.

In the embodiment of FIGS. 2 and 3, the weirs (122) and the screen panels (120) are made of metal, and welded together. In alternative embodiments (not shown), the weir members (122) may be attached by other means to the inner surface of the drum (100). As non-limiting examples, the weirs (122) may be formed integrally with the drum (100) (e.g., by molding or casting of a metal or composite material), removably attached to the drum (100) with fasteners (e.g., bolts, screws, rivets, or the like), or bonded or affixed to the drum (100) with an adhesive. In any case, the manner of attachment should be sufficient durable to withstand expected impact forces between the weirs (122) and the feed material.

In the embodiment of FIGS. 2 and 3, the drum (100) has a diameter of about 4 meters, and each weir (122) has a height (as measured radially from the inner surface of the drum (100)) of between about 75 mm and about 200 mm. In this embodiment, the helical path of each weir (122) forms a slope angle, θ, of about 30 degrees relative to a radially oriented plane. This slope angle, θ, results from the weirs (122) being disposed between the staggered apertures of the drum (100). In other embodiments, the number and geometry of the weirs (122) may differ, and may be selected by a person of ordinary skill in the art to have a desired effect on the residence time of oversize material in the drum (100).

Without restriction to a theory, the weirs (122) may reduce the residence time of oversize material in the drum (100) by guiding and propelling the oversize material from the inlet (102) to the outlet (104). The weirs (122) may also retard the advancement of the liquid fraction of the feed material, which may assist the liquid fraction exiting the drum (100) via its apertures. In testing, the inventors have found that the provision of weirs (122) reduces the residence time of the oversize lumps of a conditioned oil sand slurry (30) by about a factor of about four, while increasing the velocity of the oversize lumps relative to the inner surface of the screen panels (120) by only about twelve percent, when the drum (100) rotates at about 2.5 revolutions per minute. The net effect is a reduction of wear rate on the inner surface of the screen panels (120) by about three to four times.

Fastener Assembly for Removably Attaching a Screen Panel to the Drum Shell.

Clay and rock lumps in the partially conditioned oil sand slurry (30) may impart significant impact forces to the drum (100) during use and operation of the rotary screening apparatus (32). This can cause loosening and failure of fasteners that attach the screen panels (120) to the drum shell (110). In turn, this leads to displacement of and damage to the screen panels (120).

In the embodiment shown in FIG. 2, the rotary screening apparatus (32) includes a plurality of fastener assemblies (200) for removably attaching the screen panels (120) to the drum shell (110), while permitting the screen panel (120) to be conveniently detached from the drum shell (110) for maintenance operations. In the embodiment shown in FIGS. 2 and 3, each screen panel (120) is associated with four fastener assemblies (200) arranged in two axially spaced-apart rows, and two circumferentially spaced-apart columns. In one embodiment, the fastener assemblies (200) are sufficiently strong to allow relatively large screen panels (120) to be used, such that the entire drum shell (110) is lined by only forty screen panels (120) in total. In other embodiments, the number of screen panels (110), and the number of fastener assemblies (200) for each screen panel (120) may be fewer or greater in number, and the fastener assemblies (200) may be differently arranged. In one embodiment, each fastener assembly (200) is designed to be strong enough to retain an entire screen panel (120), which provides redundancy and better screen panel (120) retention in the case of fastener failure.

Figure 4:
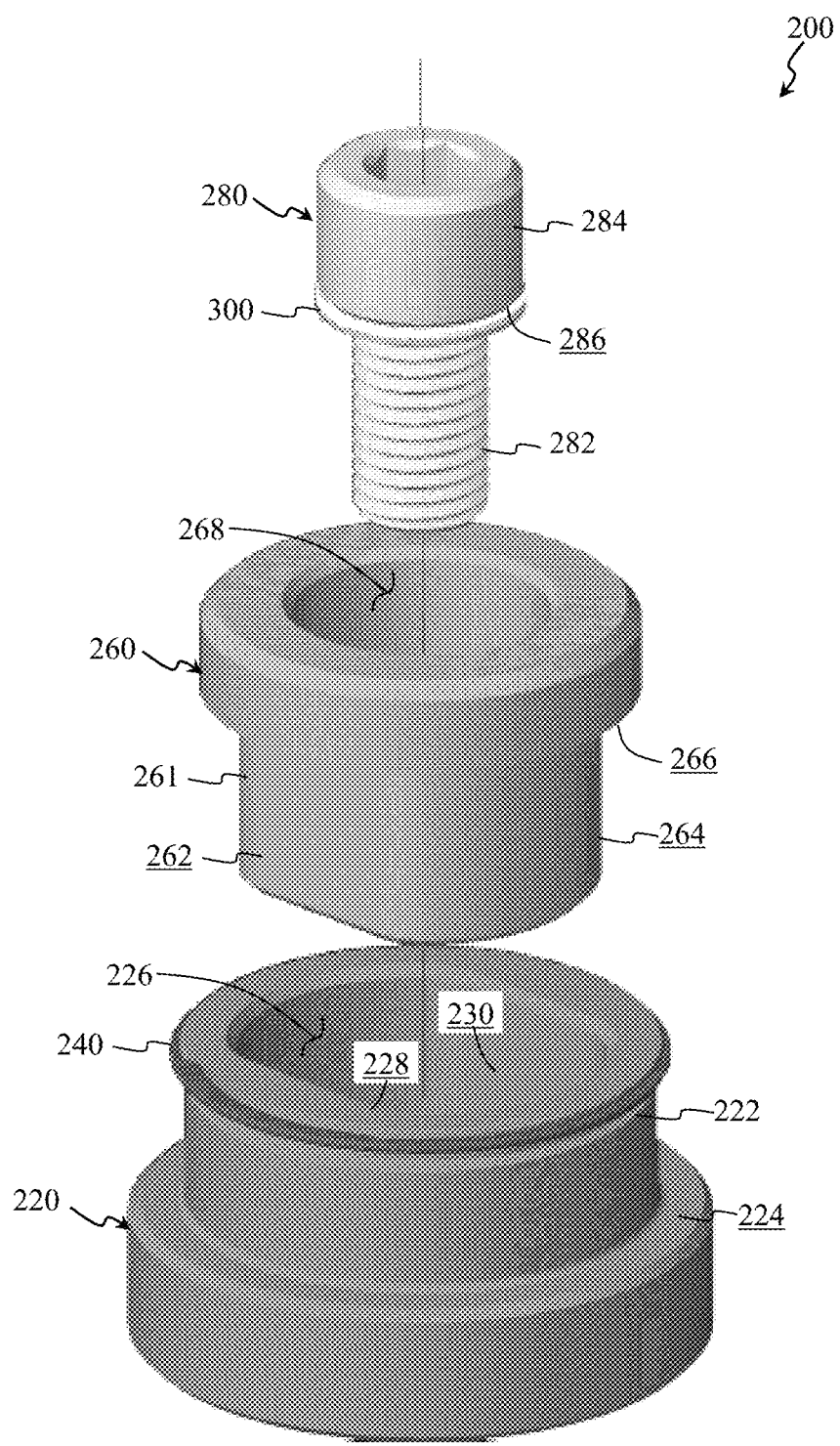
FIG. 4 shows an exploded, perspective view of a first embodiment of a fastener assembly of the present invention for securing a screen panel to a drum shell of a rotary screening apparatus.
Figure 5:
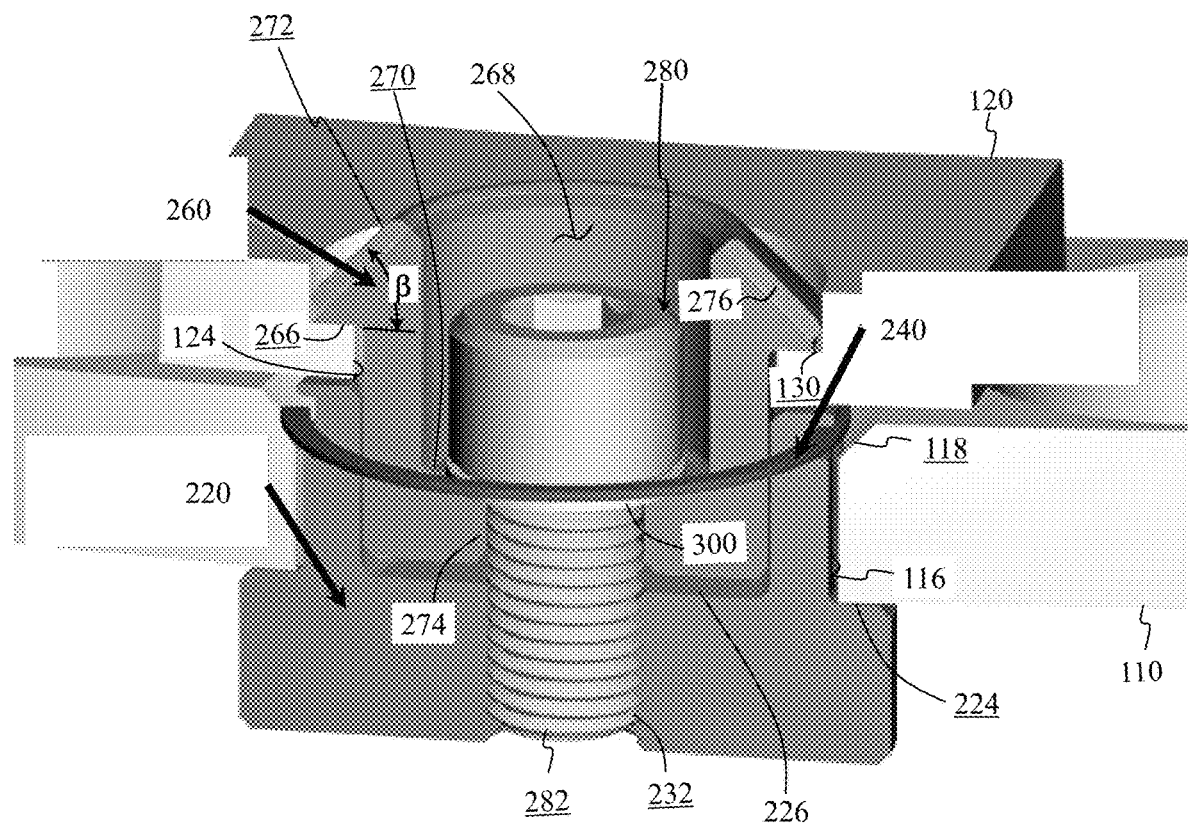
FIG. 5 shows an assembled, perspective, cross-sectional view of a second embodiment of a fastener assembly of the present invention, for securing a screen panel to a drum shell of a rotary screening apparatus.
Figure 6:
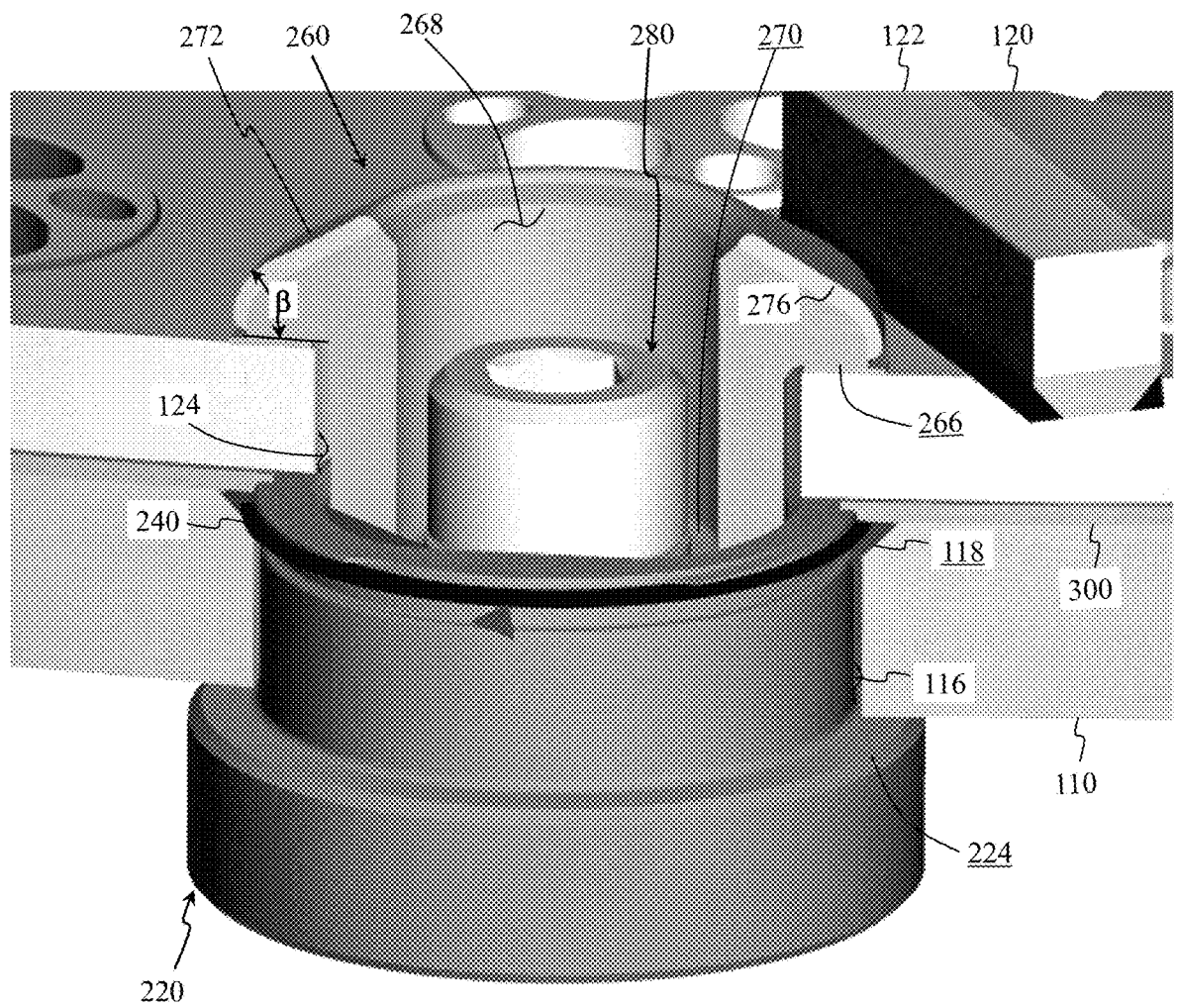
FIG. 6 shows an assembled, perspective, partial, cross-sectional view of a third embodiment of a fastener assembly of the present invention, for securing a screen panel to a drum shell of a rotary screening apparatus.

FIGS. 4, 5, and 6 show first, second, and third embodiments, respectively, of one of the fastener assemblies (200). These different embodiments are fundamentally similar in their parts and principle of operation. The fastener assembly (200) includes an outer insert (220), a retaining ring (240), an inner insert (260), a bolt (280), and a washer (300). For convenient reference, the terms "inner" and "outer" are used herein to refer to the relative position of two parts that are relatively proximal and distal, respectively, to the central axis (A) of the drum (100) in the radial direction of the drum (100), when the fastener assembly (200) attaches a screen panel (120) to the drum shell (110), as shown in FIGS. 5 and 6.

In the embodiments shown in FIGS. 4 to 6, the outer insert (220) is in the form of a flanged, internally-threaded bushing. The outer insert (220) may be made of any suitably durable material, with non-limiting examples being a metal alloy of a polyurethane having a Shore "D scale" hardness of about 700 or more. The retaining ring (240) is in the form of an arcuate member, which has a gap between its two discrete ends, despite being referred to as a "ring". As known to persons skilled in the art, and as used herein, the term "retaining ring" refers to such an arcuate member, and may be referred to as a "snap ring". The retaining ring (240) may made of any resiliently elastic material, with a non-limiting example being a metal alloy. The inner insert (260) is in the form of a flanged bushing. The inner insert (260) may be made of any suitably durable material, with a non-limiting example being a metal alloy. The bolt (280) and washer (300) may be made of any suitably durable material, with a non-limiting example being a metal alloy.

In use and operation of the embodiments shown in FIGS. 4 to 6, the retaining ring (240) is received and retained by an annular groove (222) defined by an inner portion of the outer insert (220). As shown in FIGS. 5 and 6, the inner portion of the outer insert (220) is inserted into an aperture (116) defined by the drum shell (110). The resilient elasticity of the retaining ring (240) allows it to be installed in the groove (222) in the outer insert (220) after it is pushed through the aperture (116) towards the central axis (A) of the drum (100), thus retaining the outer insert (220) in place by interfering with a countersunk surface (118) of the drum shell (110). When so retained, a radially inward-facing annular bearing surface (224) defined by an external shoulder of the outer insert (220) engages the radially outward-facing surface of the drum shell (110). The outer insert (220) may be removed from the aperture (116) by removing the retaining ring (240), allowing the inner portion of the outer insert (220) to be withdrawn from the aperture (116).

Once the outer insert (220) is attached to the drum (110), the outer portion (261) of the inner insert (260) is inserted through an aperture (124) of the screen panel (120) and received by a central pocket (226) of the outer insert (220). When so received, a radially outward-facing annular bearing surface (266) defined by an external shoulder of the inner insert (260) engages the radially inward-facing surface of the screen panel (120).

The bolt (280) is inserted into a central pocket (268) of the inner insert (260), so that the threaded bolt shaft (282) extends through a central bolt opening (274) of the inner insert (220) and into mating relationship with a threaded bore (232) of the outer insert (220). The optional washer (300) is disposed between a radially outward-facing surface (286) of the bolt head (284), and a radially inward-facing surface (270) of the inner insert (260) to protect the inner insert (260) from damage. As the bolt (280) is screwed into the threaded bore (232), the radially outward-facing surface (286) of the bolt head (284) (via the washer (300)) bears against the radially inward-facing surface (270) of the inner insert (260). The resulting tension in the bolt (280) causes the annular bearing surface (224) of the outer insert (220) and the annular bearing surface (266) of the inner insert (260) to clamp together the drum shell (110) and the screen panel (120). Removal of the screen panel (120) from the drum shell (110) involves reversing the above steps in reverse order. Installation and removal of the fastener assembly (200) does not require simultaneously access the inside and outside of the drum (100), thus allowing installation or removal of the fastener assembly (200) by a single worker. Additional features of the fastener assembly are further described below.

Fastener assembly: anti-rotation surfaces.

When the bolt (280) is screwed into the threaded bore (232) of the outer insert (220), friction between the bolt head (284) (via the washer (300)) and the inner insert (260) applies a torque to the inner insert (260) that tends to rotate the fastener assembly (200) relative to the drum shell (110) and the screen panel (120). Such rotation would limit the torque that could be applied to the bolt (280), and hence the clamping force applied to the drum shell (110) and screen panel (120). In the embodiments shown in FIG. 4, such rotation is limited or prevented by engagement of a pair of external flat surfaces (262, 264) of the inner insert (260) with complementary flat surfaces (126, 128) that partially define each of the apertures (124) of the screen panel (120) (see FIG. 8A). Further, rotation of the outer insert (220) relative to the inner insert (260) is limited or prevented by engagement of the flat surfaces (262, 264) with complementary flat surfaces (228, 230) that partially define the central pocket (226) of the outer insert (220). In other embodiments, this anti-rotation feature can be effected by other non-cylindrical external shapes of the inner insert (260), and complementary shapes of the aperture (124) of the screen panel (120), and of the central pocket (226) of the outer insert (220).

Fastener Assembly: Bolt Recessed within Pocket of Inner Insert.

The bolt (280) is preferably protected as much as possible against loosening or damage by impact with material that is screened through the drum (100). To this effect, in the embodiments shown in FIGS. 4 to 6, the bolt head (284) is recessed within the central pocket (268) of the inner insert (260) when the fastener assembly (200) is assembled. Further, the radially extending walls that define the central pocket (268) are relatively close to the sides of the bolt head (284). The bolt head (284) is an internal hex bolt thus avoiding the need for clearance between such walls and the bolt head (284) for accommodating a drive tool.

Recessing the bolt head (284) within the central pocket (268) of the inner insert (260) may shelter the bolt head (284) from impacts with material being screened through the drum (100).

Fastener Assembly: Frusto-Conical Surface of Inner Insert.

The inner insert (260) is preferably protected as much as possible from damage by impact with material that is screened through the drum (100). To this effect, in the embodiments shown in FIGS. 5 to 6, the inner portion of the inner insert (260) has a frusto-conical surface (272), which forms an acute angle, β, (i.e., between 0 and 90 degrees) in relation to the inner surface of the screen panel (120). Preferably, the acute angle, β, is less than about 45 degrees, and more preferably less than about 30 degrees. In comparison to cylindrical shape of the embodiment shown in FIG. 4, the frusto-conical surface (272) may help reduce the impact forces with material screened through the drum (100) as the drum (100) rotates. The impact force between the material and the inner insert (260) is partly attributable to relative movement between them in the tangential direction, as the drum (100) rotates. The acute angle formed by the surface (272) may reduce the normal component of such impact force.

Fastener Assembly: Inner Insert Received within a Counterbore of the Screen Panel.

As noted, the inner insert (260) is preferably protected against damage by impact with material that is screened through the drum (100). To this effect, in the embodiment shown in FIG. 5, the annular bearing surface (266) of the inner insert (260) engages a counterbore surface (130) formed in the inner surface of the screen panel (120), so that the external surface (272) of the inner insert (260) is at least partly radially recessed within the thickness of the screen panel (120). In embodiments (not shown), the external surface (272) of the inner insert (260) may be wholly recessed within the thickness of the screen panel (120). Recessing the inner insert (260) partly or wholly within the thickness of the screen panel (120) may shelter the inner insert (260) from impacts with material being screened through the drum (100).

Fastener Assembly: Inner Insert with Wear-Resistant Outer Layer.

Despite the aforementioned features, the inner insert (260) is nonetheless exposed to the material being screened through the drum (100), and as such, the inner insert (260) is preferably durable and hardwearing. To this effect, in the embodiments shown in FIGS. 5 and 6, the radially inward-facing surface (272) of the inner insert (260) is formed by a sacrificial layer (276) of a wear-resistant material having a greater hardness than the metal material forming the remainder of the inner insert (260). As a non-limiting example, the wear-resistant material may comprise tungsten carbide.

Layer of Shock Absorbing Material Between Drum and Screen Panel

As noted, clay and rock lumps in the conditioned oil sand slurry (30) may impart significant impact forces to the screen panels (120) during use and operation of the rotary screening apparatus (32). The screen panels (120) are preferably protected against such impacts to limit damage. To this effect, in the embodiment shown in FIGS. 6, 7, and 9B, a layer of shock absorbing material (300) is provided between the drum shell (110) and the screen panel (120). The shock absorbing material may be any suitable material that exhibits viscoelasticity. The person skilled in the art may select an appropriate shock absorbing material (300) and its thickness having regard to its mechanical characteristics, and the anticipated magnitude of impact forces on the screen panels (120). In the embodiment shown in FIG. 7, for example, the layer of shock absorbing material (300) is polyurethane, and has a thickness of about 3 mm, in comparison to the drum shell (110) having a thickness of 30 mm, and the screen panel (120) having a thickness of 19 mm.

Screening Aperture with Reverse Taper.

A conventional screening aperture is "straight"—i.e., the diameter of the hole is constant through its thickness in the direction from the inner side of the drum (100) to the outer side of the drum (100). The tendency of a straight screening aperture to become plugged with screened material increases as the size of the screening aperture decreases. The inventors have found that plugging of a straight screening aperture with partially conditioned oil sand slurry is generally not a problem for a straight screening aperture having a diameter of about 68 mm, but is a significant issue for a straight screening aperture having a diameter of between about 18 mm and 35 mm.

Figure 7:
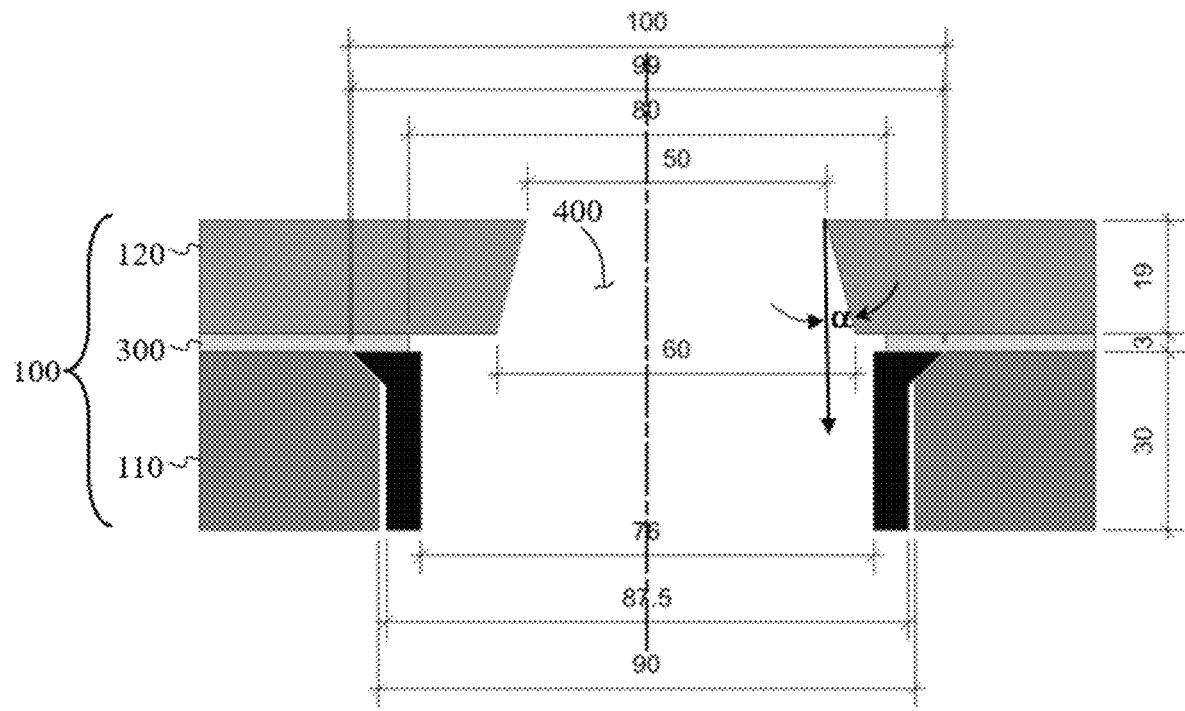
FIG. 7 shows a cross-sectional view of an embodiment of a screen panel of the present invention, having a screening aperture with a reverse taper, in relation to a drum shell of a rotary screening apparatus.

To reduce the tendency of a screening aperture to become plugged with screened material, the screening apertures of the present invention have a "reverse taper"—i.e., the diameter of the hole increases through its thickness in the direction from the inner side to the outer side of the drum (100). As an example, FIG. 7 shows a cross-sectional view of an embodiment of a screen panel (120), having a screening aperture (400) with a reverse taper, in relation to a drum shell (110) of a rotary screening apparatus (32). In this embodiment, the screen panel has a thickness of 19 mm, and the diameter of the screen aperture (400) increases from a minimum of 50 mm at the inner side of the screen panel (120) to a maximum 60 mm at the outer side of the screen panel (400). The resulting reverse taper angle, a, is 14.7°, being equal to the arctangent of (60 mm-50 mm)/[2×19 mm]. As used herein, the "reverse taper angle" refers the angular deviation of the wall defining the reverse taper screening aperture from a wall defining a straight screening aperture.

In embodiments, the reverse taper angle may be less than or equal to about 15 degrees; more particularly, less than or equal to about 10 degrees; or more particularly, less than or equal to about 7 degrees. The inventors have found that a reverse taper angle as little as 10 degrees is effective in eliminating plugging of screening apertures (400) with diameters of 50 mm, when screening an conditioned oil sand slurry. The inventors believe that smaller reverse angle tapers may also reduce plugging for screening apertures (400) with diameters in the range of 18 mm to 50 mm.

In the embodiment shown in FIG. 7, the drum (100) is formed by the combination of the drum shell (110) and the drum liner panel (120), with the latter defining the reverse tapered screening apertures (400). In other embodiments (not shown), the drum (100) may not have drum liner panels (120), and as such, a structure analogous to an unlined drum shell (110) may define the reverse tapered screening apertures (400).

Insert Defining Screening Aperture.

Manufacturing a screen panel (120) with smaller screening apertures (400) increases the required machining, tooling, and completion time. It may be impractical to machine screening apertures (400) when the screen panel (120) is made of a hard material such as hardened steel and the screening apertures (400) are less than about 40 mm in size. To overcome this difficulty, the present invention comprises an insert (500) defining one or more of the screening apertures (504), which is manufactured separately from the screen panel (120), and subsequently attached to the screen panel (120) by insertion into a relatively larger insert aperture (132) defined by the screen panel.

Figure 8A:
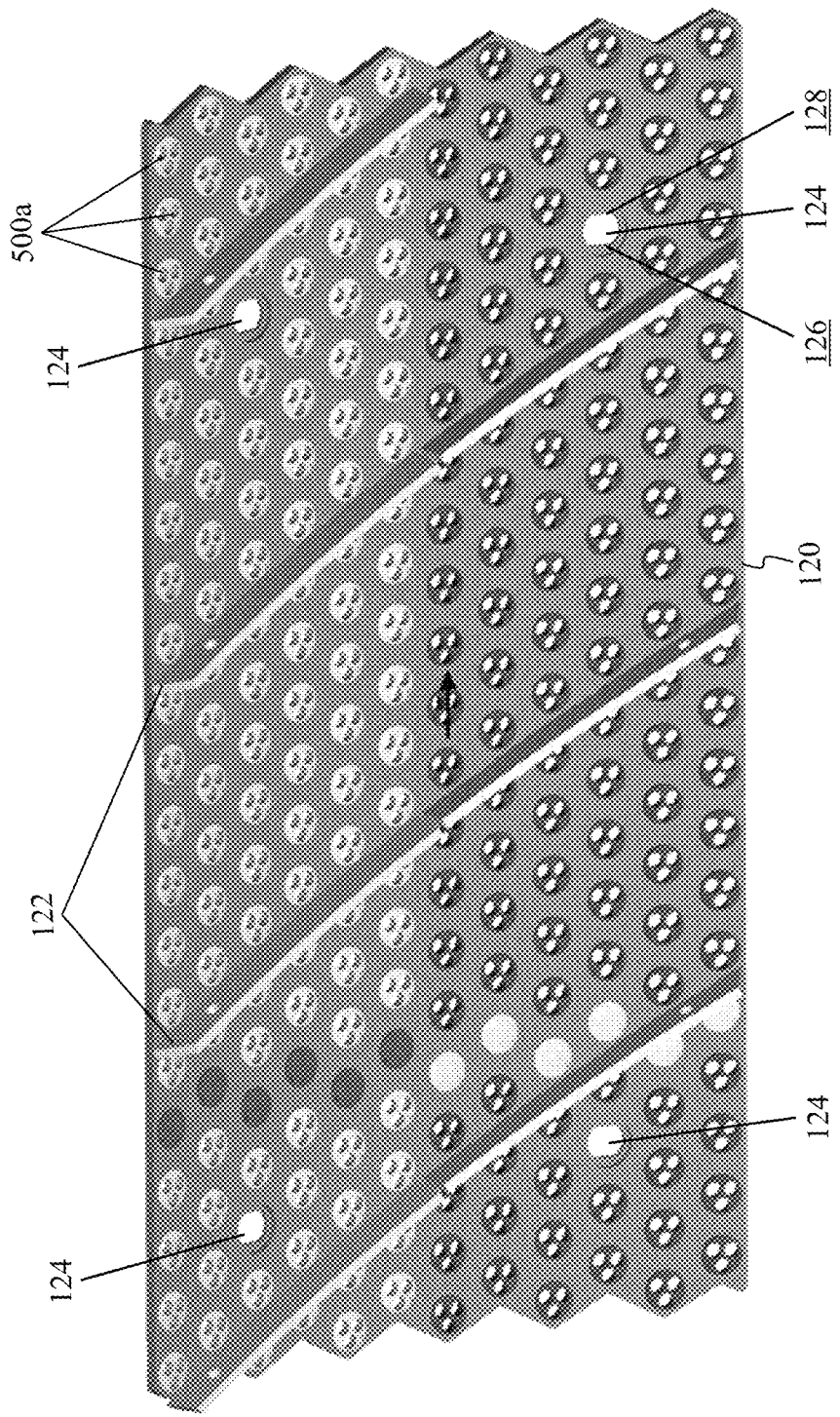
FIG. 8A shows a perspective view of a second embodiment of a screen panel of the present invention, with weirs and screen panel inserts that define screening apertures.
Figure 8B:
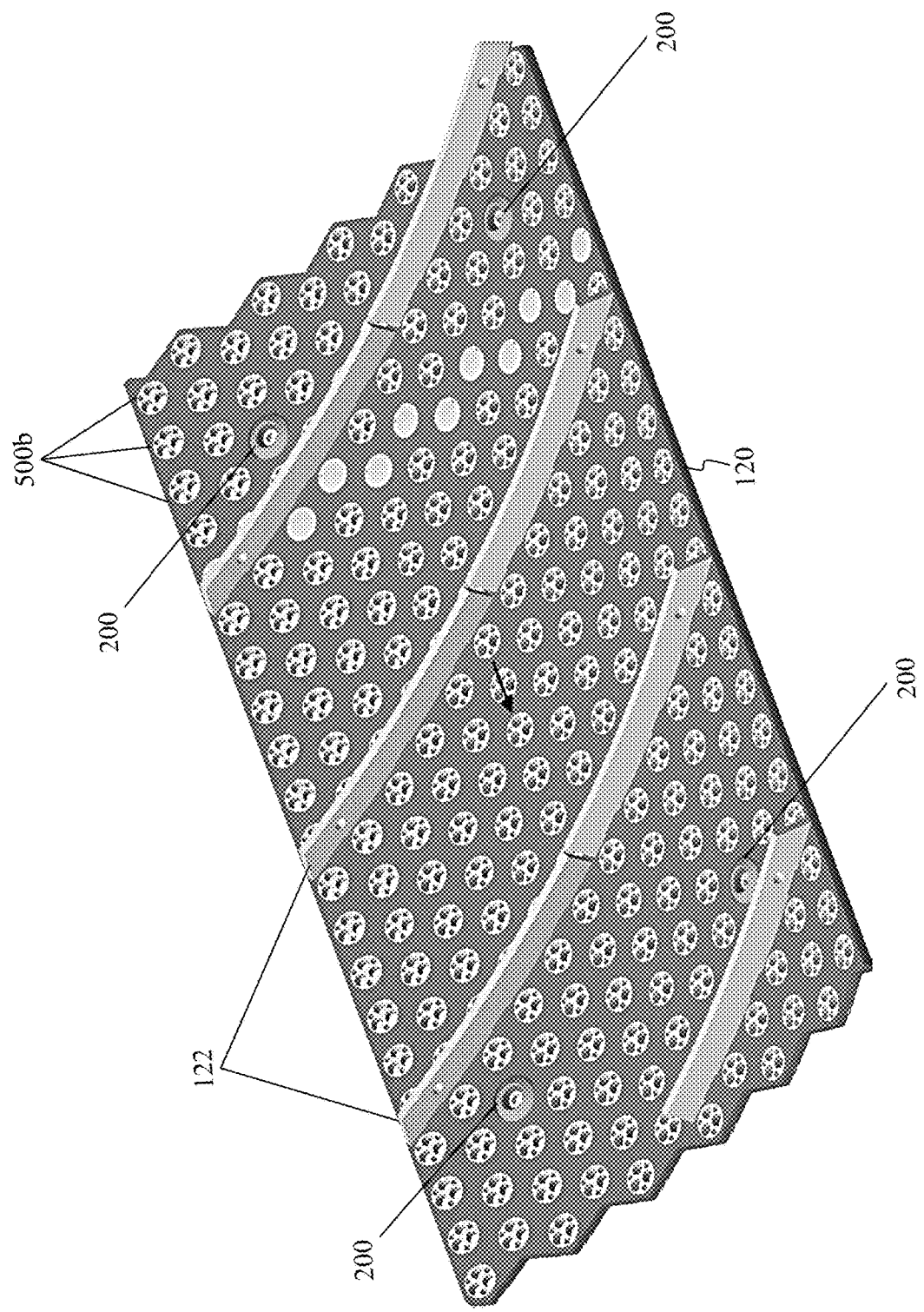
FIG. 8B shows a perspective view of the screen panel of FIG. 8A, with installed fastener assemblies, and a different embodiment of screen panel inserts.

FIG. 8A shows a screen panel (120) with a plurality of attached inserts (500a), each of which defines three screening apertures. FIG. 8B shows the same screen panel (120) with a plurality of different inserts (500b), each of which defines six screening apertures. Therefore, in embodiments where the inserts (500) are removably attached to the screen panel (120), the use of the inserts (500) may allow for reconfiguration of the screening apertures for a single screen panel (120). That is, some or all of the inserts (500a) may be removed from the screen panel (120), and inserts (500b) having a different configuration of screening apertures may be installed in the screen panel (120) to replace the removed inserts (500a). The inserts (500) may be made of any suitably durable material, such as a metal alloy. In embodiments, the inserts (500) can be cast, sintered or additively manufactured from materials such as metal alloys, or a material with higher wear resistance than hardened steel, such as white iron, ceramic, or tungsten carbide. The material forming the insert (500) may be different than the material forming the screen panel (120) or the drum shell (110), or both.

Figure 9A:
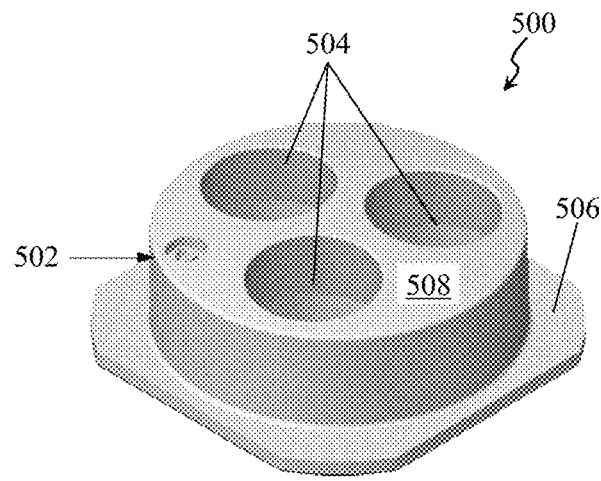
FIG. 9A shows a perspective view of a first embodiment of a screen panel insert of the present invention.
Figure 9B:
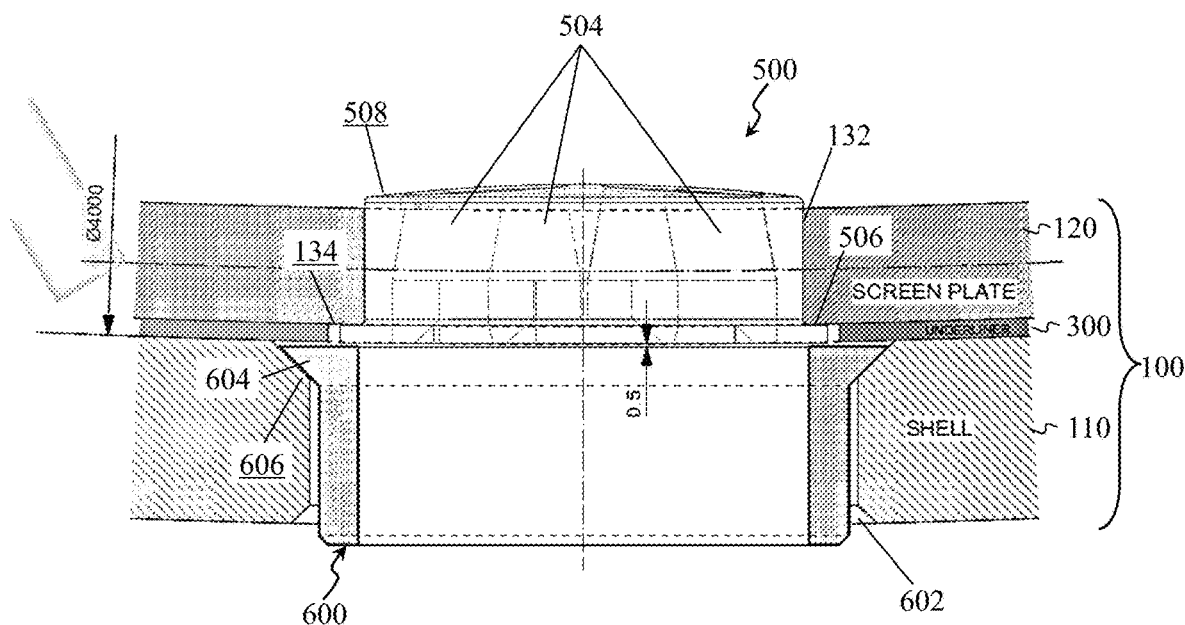
FIG. 9B shows a cross-sectional view side view of the screen panel insert of FIG. 9A, a portion of a screen panel, and a portion of a drum shell of a rotary screening apparatus.
Figure 9C:
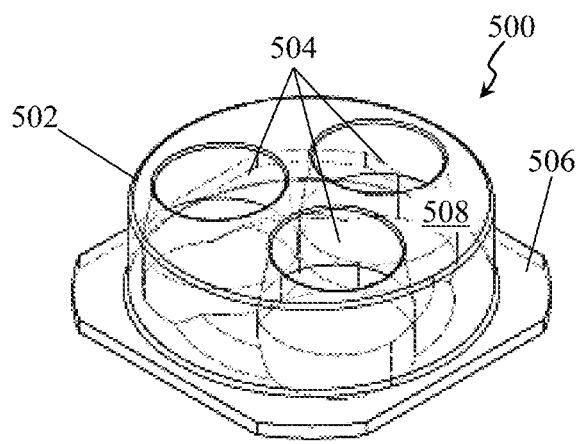
FIG. 9C shows a perspective view of the screen panel insert of FIG. 9A.
Figure 9D:
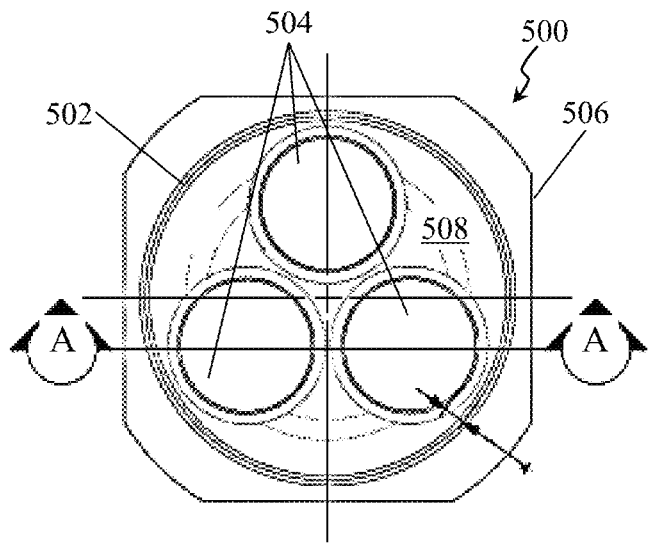
FIG. 9D shows a top view of the screen panel insert of FIG. 9A.

FIGS. 9A to 9E show views of a first embodiment of a screen panel insert (500). In this embodiment, the insert (500) has a puck-shaped body (502) that defines three screening apertures (504). FIG. 9B shows an assembly including the insert (500) installed in the drum (100). Prior to installation of the insert (500), the drum shell (110) and the screen panel (120) are separate from each other. A flanged bushing (600) is inserted into an aperture (602) defined by the drum shell (110), and retained therein by engagement of an integral flange (604) with a countersunk surface (606) of the drum shell (110). The flanged bushing (600) may be made of any suitable material, with a non-limiting example being polyurethane having a Shore "D scale" hardness of about 70. The body (502) of the insert (500) is inserted through an aperture (132) defined by the screen panel (120) such that an integral flange (506) of the insert (500) engages the outer surface (134) of the screen panel (120). The screen panel (120) is then attached to the drum shell (110), such as by fastener assemblies (200) as described above. When so fastened together, the flange (604) of the flanged bushing (600) and the outer surface (134) of the screen panel (120) clamp opposite sides of the flange (506) of the insert (500). Accordingly, retention of the insert (500) to the drum (100) does not require use of welds, glue, brazing, or other attachment means directly applied to the insert (500) (although such means may be optionally used.) This allows the insert (500) to be conveniently removed for repair or replacement. In other embodiments, the clamping of the flange (506) by the screen plate (120) and the drum shell (110) may be direct (i.e., by direct contact between the flange (506) and the screen plate (120) or the drum shell (110)) or indirect (i.e., with an intervening part between the flange (506) and the screen panel (120) or the drum shell (110)).

Referring to FIG. 9B, the thickness of the body (500) is slightly greater than the thickness of the screen panel (120), such that a wear surface (508) of the insert (500) protrudes radially inward of the inner surface of the screen panel (120). Also, the wear surface (508) is crowned or domed. These features may extend the wear life of the insert (500).

Figure 9E:
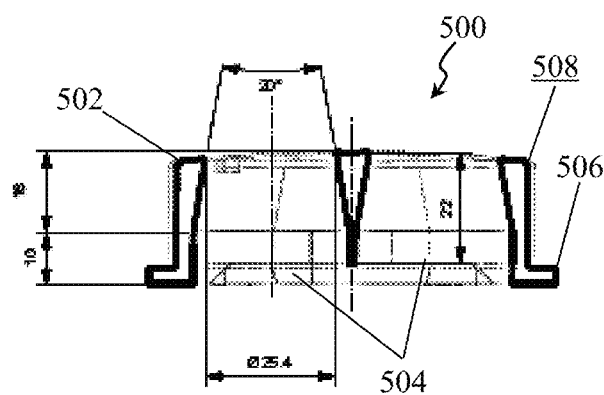
FIG. 9E shows a cross-sectional view of the screen panel insert of FIG. 9A, along line A-A of FIG. 9D.

Referring to FIG. 9E, the screening apertures have a diameter of about 25.4 mm, measured at the wear surface (508). The screening apertures (504) have a reverse tapered inner portion proximal to the wear surface (508) with a reverse taper angle of about 10°, and a straight portion proximal to the flange (506). The reverse taper may help to limit or prevent plugging of the screening apertures (504), in the manner described above in respect to screening apertures (400) defined by the screen panel (120).

Figure 10A:
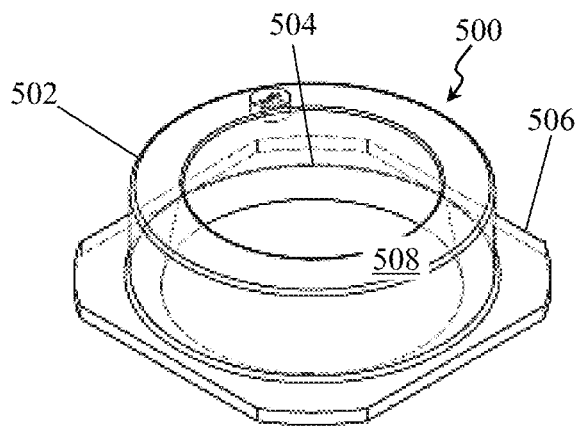
FIG. 10A shows a perspective view of a second embodiment of a screen panel insert for use with a screen panel of a rotary screening apparatus.
Figure 10B:
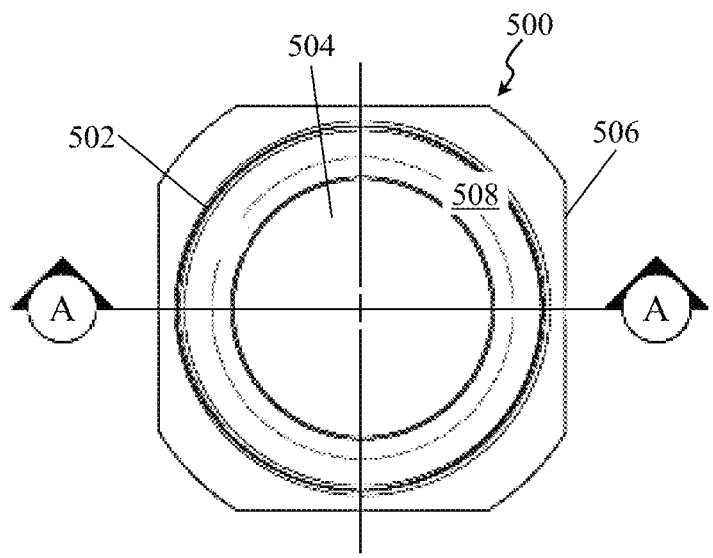
FIG. 10B shows a top view of the screen panel insert of FIG. 10A.
Figure 10C:
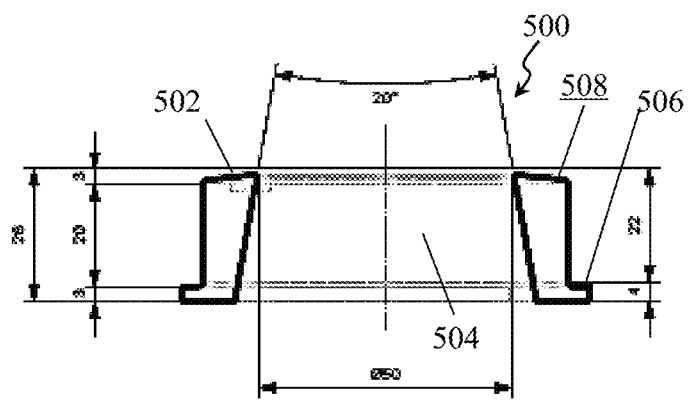
FIG. 10C shows a cross-sectional view of the screen panel insert of FIG. 10A, along line A-A of FIG. 10B.

FIGS. 10A to 10C show another embodiment of an insert (506) defining a single screening aperture (504) with a reverse taper angle of about 10°, along the entire depth of the insert (504).

Figure 11A:
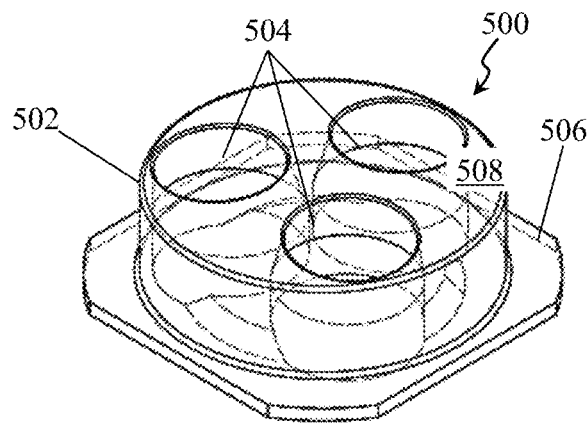
FIG. 11A shows a perspective view of a second embodiment of a screen panel insert for use with a screen panel of a rotary screening apparatus.
Figure 11B:
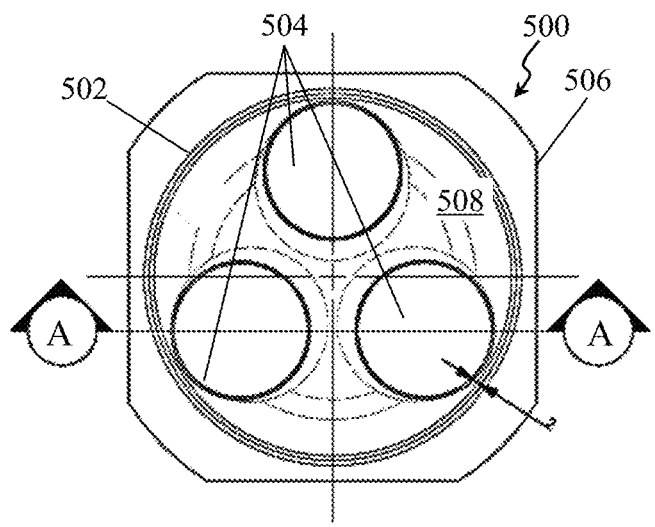
FIG. 11B shows a top view of the screen panel insert of FIG. 11A.
Figure 11C:
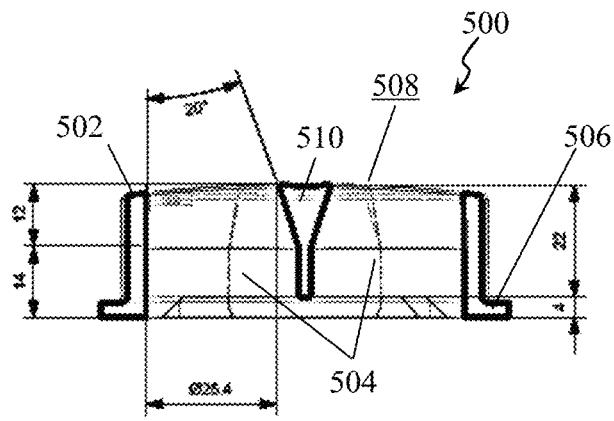
FIG. 11C shows a cross-sectional view of the screen panel insert of FIG. 11A, along line A-A of FIG. 11B.

FIGS. 11A to 11C show another embodiment of an insert (500) similar to that shown in FIGS. 9A to 9E, but differing as follows. First, the depth of the reverse tapered inner portion of the screening apertures (204) is reduced to about 12 mm from about 16 mm. Second, the central axes of the screening apertures (504) are "eccentric"; i.e., they are at an angle to the central axis of the body (502), such that they converge toward the central axis of the body (502) in the direction from the wear surface (508) to the flange (506). The reduced depth of the reverse taper should be sufficient to prevent aperture blockages, while allowing the largest possible reverse taper angle in a confined space. Likewise, the eccentric arrangement of the aperture tapers is specifically designed to maximize the width of the "ligament" (510) of wear material in between the apertures. This ligament (510) will gradually wear away, and a wider ligament (510) should provide a longer wear life for the insert (500) as a whole.

Figure 12A:
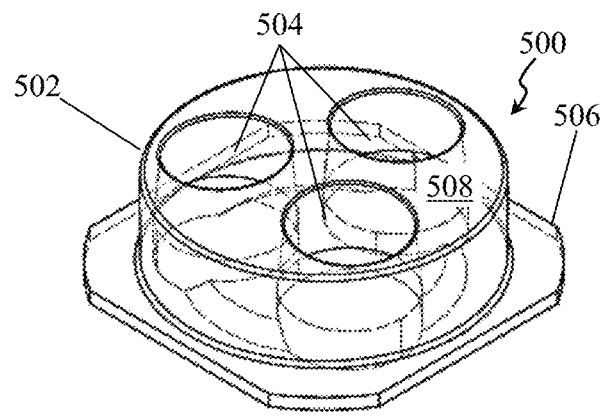
FIG. 12A shows a perspective view of a third embodiment of a screen panel insert for use with a screen panel of a rotary screening apparatus.
Figure 12B:
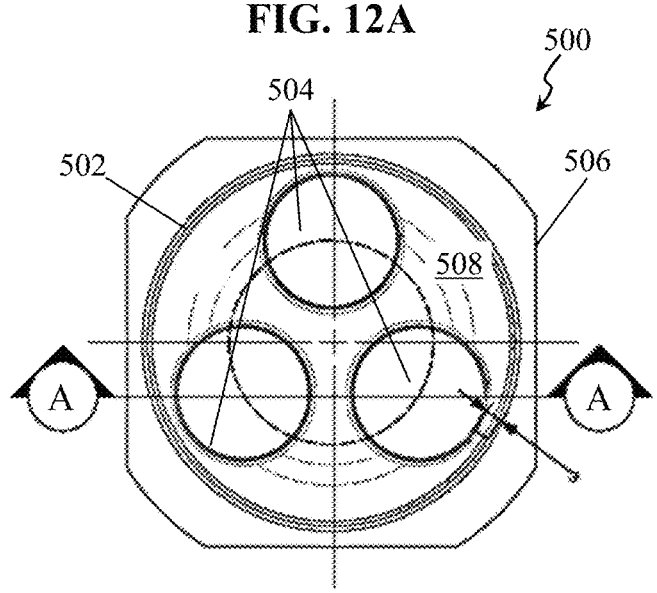
FIG. 12B shows a top view of the screen panel insert of FIG. 12A.
Figure 12C:
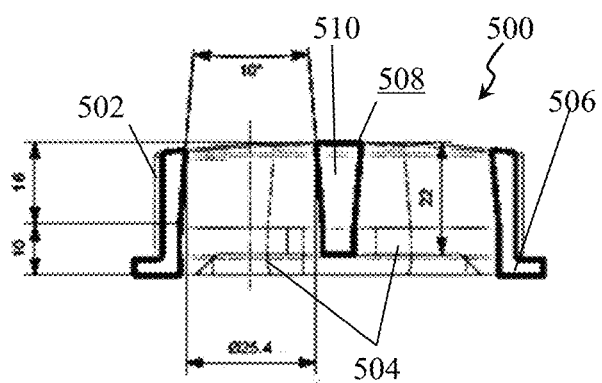
FIG. 12C shows a cross-sectional view of the screen panel insert of FIG. 12A, along line A-A of FIG. 12B.

FIGS. 12A to 12C show another embodiment of an insert (500) similar to that shown in FIGS. 9A to 9E, but differing in that the reverse taper angle is reduced to about 5° from about 10°. This smaller taper angle leaves a more substantial cross-section of material in the ligament (510) between the apertures (504), which could extend wear life in applications where the smaller taper angle does not lead to aperture blockages.

Figure 13A:
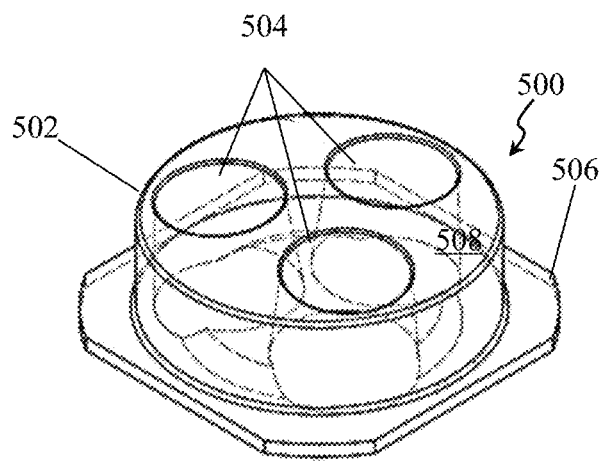
FIG. 13A shows a perspective view of a fourth embodiment of a screen panel insert for use with a screen panel of a rotary screening apparatus.
Figure 13B:
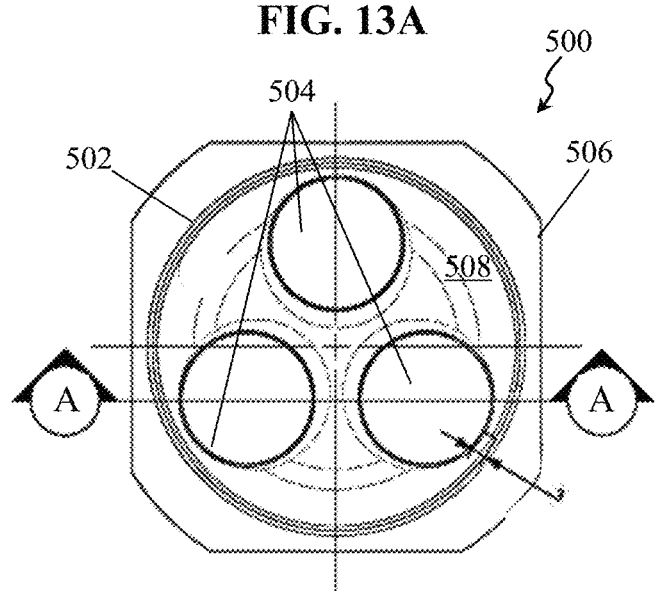
FIG. 13B shows a top view of the screen panel insert of FIG. 13A.
Figure 13C:
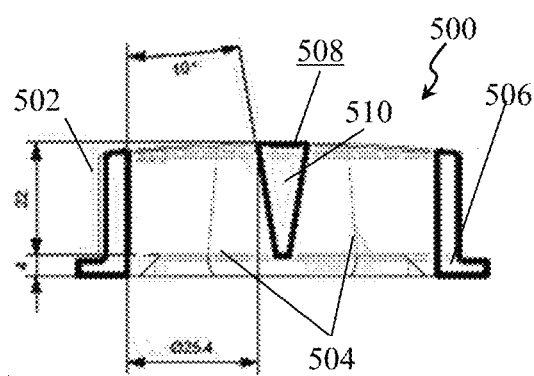
FIG. 13C shows a cross-sectional view of the screen panel insert of FIG. 13A, along line A-A of FIG. 13B.

FIGS. 13A to 13C show another embodiment of an insert (500) similar to that shown in FIGS. 11A to 11C, but differing as follows. First, the depth of the reverse tapered inner portion of the screening apertures (204) is increased to about 22 mm from about 12 mm, while the depth of the straight portion of the screening aperture (204) is eliminated. Second, the reverse taper angle of the screening apertures (504) is reduced to about 5° from about 10°.

Figure 14A:
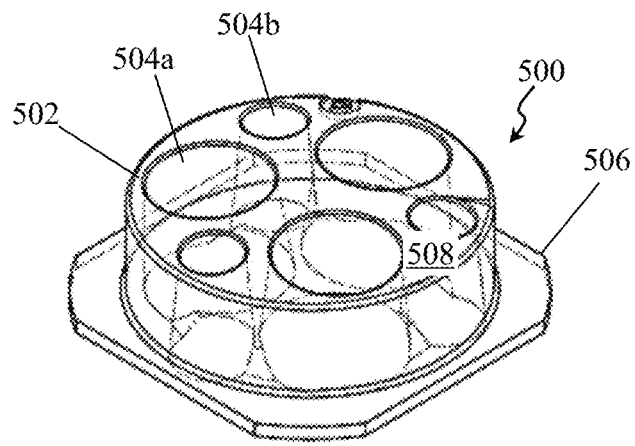
FIG. 14A shows a perspective view of a fifth embodiment of a screen panel insert for use with a screen panel of a rotary screening apparatus.
Figure 14B:
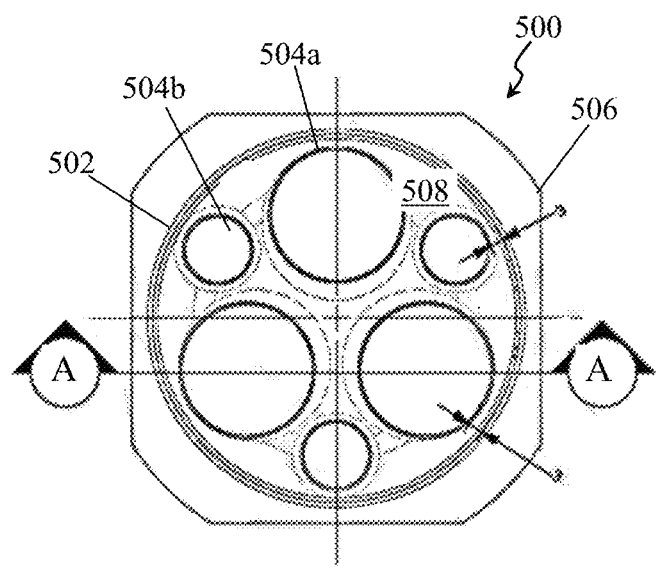
FIG. 14B shows a top view of the screen panel insert of FIG. 14A.
Figure 14C:
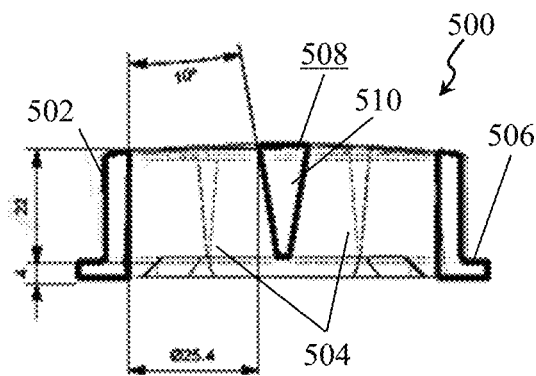
FIG. 14C shows a cross-sectional view of the screen panel insert of FIG. 14A, along line A-A of FIG. 14B.

FIGS. 14A to 14C show another embodiment of an insert (500) similar to that shown in FIGS. 13A to 13C, but differing in that the insert (500) defines three screening apertures (504b) having a smaller diameter of about 13 mm, in addition to the three screening apertures (504a) having a larger diameter of about 25.4 mm. In many processes, such as casting, sintering and additive manufacturing, the provision of the additional small screening apertures (504b) does not add significant cost, but they do add significant drainage area for through flow of the fluid component of the slurry.

Figure 15A:
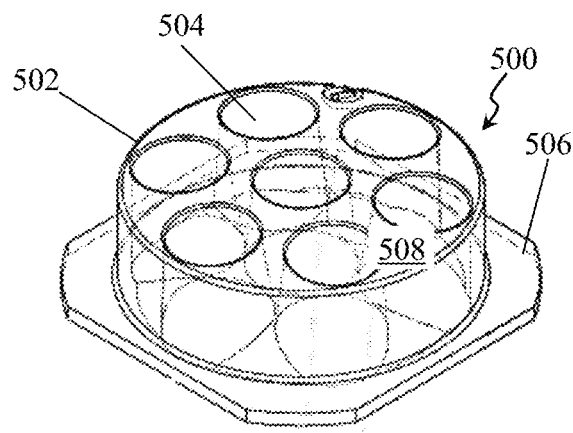
FIG. 15A shows a perspective view of a sixth embodiment of a screen panel insert for use with a screen panel of a rotary screening apparatus.
Figure 15B:
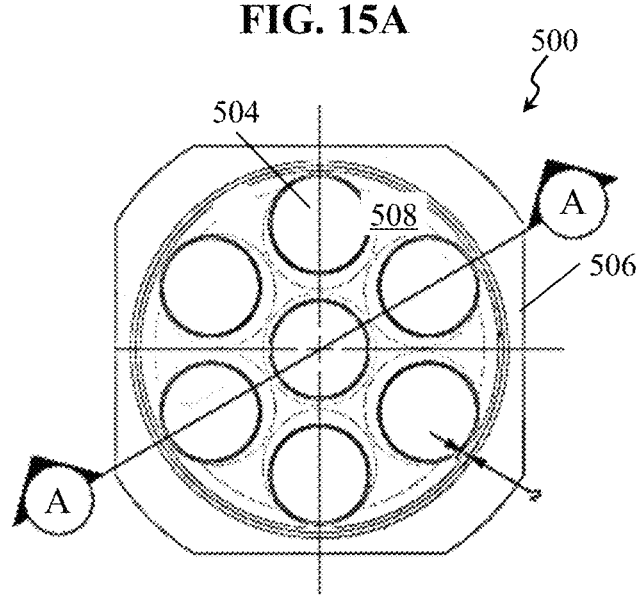
FIG. 15B shows a top view of the screen panel insert of FIG. 15A.
Figure 15C:
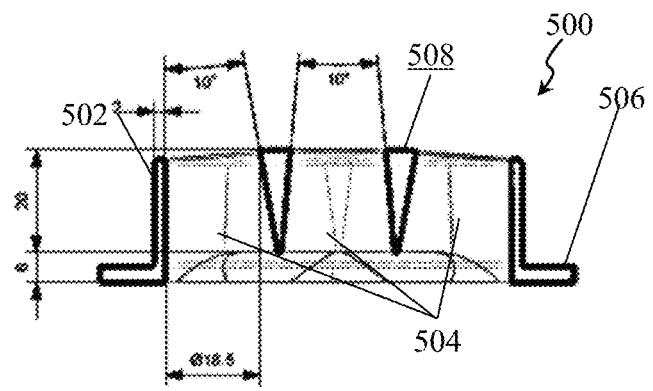
FIG. 15C shows a cross-sectional view of the screen panel insert of FIG. 15A, along line A-A of FIG. 15B.

FIGS. 15A to 15C show another embodiment of an insert (500) similar to that shown in FIGS. 13A to 13C, but differing as follows. First, the insert (500) defines seven screening apertures (504). A central screening aperture (504) is aligned with the center of the body (502) and the remaining six screening apertures (504) are arranged around the central one. Second, the screening apertures (504) are reduced in diameter to about 18.5 mm from about 25.4 mm. Third, the depth of the reverse tapered inner portion of the screening apertures (204) is reduced to about 20 mm from about 22 mm. Again, in this embodiment, the aperture tapers are eccentrically arranged in order to leave the widest possible ligament (510) of wear material in between the apertures on the inner wear surface, thus extending component life.

Figure 16A:
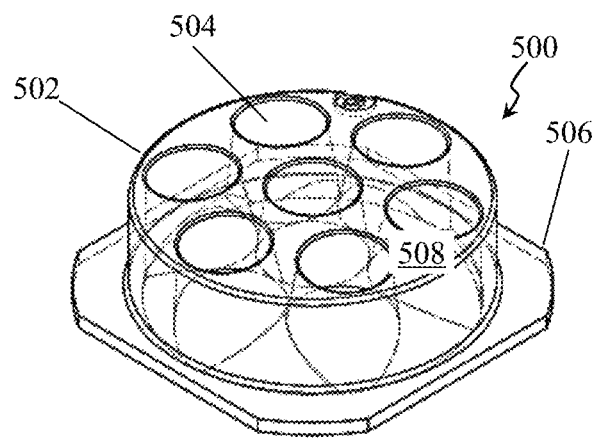
FIG. 16A shows a perspective view of a seventh embodiment of a screen panel insert for use with a screen panel of a rotary screening apparatus.
Figure 16B:
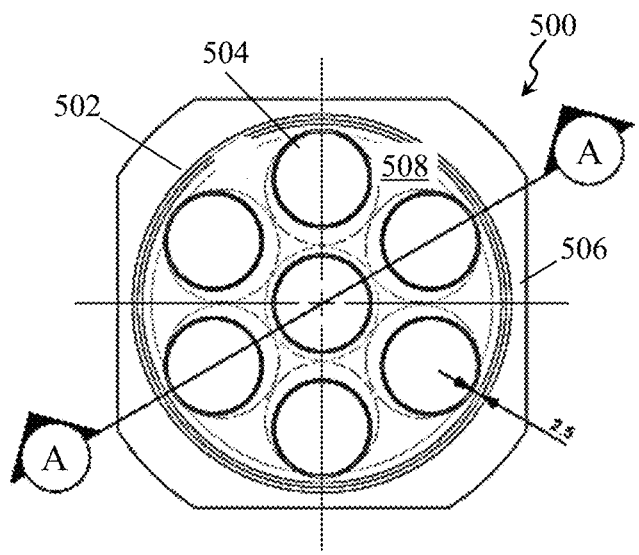
FIG. 16B shows a top view of the screen panel insert of FIG. 16A.
Figure 16C:
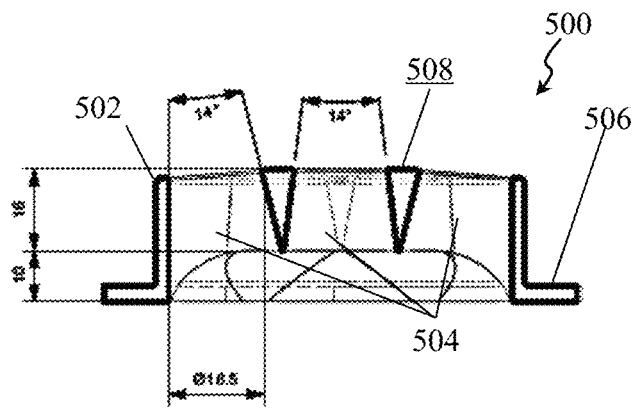
FIG. 16C shows a cross-sectional view of the screen panel insert of FIG. 16A, along line A-A of FIG. 16B.

FIGS. 16A to 16C show another embodiment of an insert (500) similar to that shown in FIGS. 15A to 15C, but differing as follows. First, the depth of the reverse tapered inner portion of the screening apertures (204) is decreased to about 16 mm from about 20 mm. Second, the reverse taper angle of the screening apertures (504) is increased to about 7° from about 5°. In an application more susceptible to aperture blockages, the higher reverse taper angle could be useful.

Interpretation.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A method for extracting bitumen from a slurry comprising bitumen, water, and lumps comprising one or a combination of clay and rock, the method comprising the sequential steps of:
   (a) limiting the size of the lumps in the slurry to a first size by comminuting the lumps larger than the first size before or during preparation of the slurry, or by screening the slurry to remove the lumps larger than the first size from the slurry;
   (b) transporting the slurry through a pipeline for a distance sufficient to at least partially condition the slurry;
   (c) screening the slurry through a rotary screening apparatus to remove the lumps that are larger than a second size from the slurry, wherein the second size is smaller than the first size; and
   (d) subjecting the slurry to gravity separation to separate the bitumen as a bitumen froth.

2. The method of claim 1, wherein the first size is about 125 mm.

3. The method of claim 1, wherein the second size is about 68 mm or less.

4. The method of claim 3, wherein the second size is about 50 mm or less.

5. The method of claim 4, wherein the second size is about 25 mm or less.

6. The method of claim 1, wherein the slurry is only partially conditioned in step (b), and wherein the method further comprises transporting the slurry through a second pipeline to further condition the slurry after step (c) and before step (d).

7. The method of claim 1, wherein the rotary screening apparatus comprises a drum defining screening apertures, and internally lined by a weir defining a helical path.

8. The method of claim 7, wherein the helical path defines a slope angle of about 30 degrees relative to a radial plane of the drum.

9. The method of claim 1, wherein the rotary screening apparatus comprises a drum defining screening apertures with a reverse taper angle.

10. The method of claim 9, wherein the reverse taper angle is less than or equal to about 10 degrees.

11. The method of claim 7, wherein the weir has a height between 75 mm and 200 mm, as measured radially from an inner surface of the drum.

12. The method of claim 11, wherein the lumps have a size larger than 50 mm.

13. The method of claim 11, wherein the drum has a diameter between 3.6 meters and 4.4 meters.

* * * * *